(12) United States Patent
Lee et al.

(10) Patent No.: US 12,505,009 B2
(45) Date of Patent: Dec. 23, 2025

(54) ELECTRONIC DEVICE PROVIDING WARNING MESSAGE THROUGH COMMUNICATION INTERFACE, AND METHOD OF OPERATING THE SAME

(71) Applicant: SAMSUNG ELECTRONICS CO., LTD., Suwon-si (KR)

(72) Inventors: Kyungkeun Lee, Suwon-si (KR); Bumjun Kim, Suwon-si (KR); Seunghan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 18/435,684

(22) Filed: Feb. 7, 2024

(65) Prior Publication Data

US 2024/0411637 A1   Dec. 12, 2024

(30) Foreign Application Priority Data

Jun. 8, 2023  (KR) .................. 10-2023-0073560

(51) Int. Cl.
*G06F 11/00* (2006.01)
*G06F 11/07* (2006.01)

(52) U.S. Cl.
CPC ...... *G06F 11/0793* (2013.01); *G06F 11/0736* (2013.01); *G06F 11/079* (2013.01)

(58) Field of Classification Search
CPC . G06F 11/0793; G06F 11/0736; G06F 11/079
See application file for complete search history.

(56) References Cited

U.S. PATENT DOCUMENTS

| | | | |
|---|---|---|---|
| 9,043,638 B1 * | 5/2015 | Su | G06F 11/22 714/6.1 |
| 10,042,583 B2 | 8/2018 | Qin et al. | |
| 10,209,750 B2 | 2/2019 | Marripudi et al. | |
| 10,698,460 B2 | 6/2020 | Ping | |
| 10,901,898 B2 | 1/2021 | Wu et al. | |
| 11,372,460 B2 | 6/2022 | Ping | |

(Continued)

FOREIGN PATENT DOCUMENTS

EP    3 629 127 A1    4/2020

*Primary Examiner* — Jonathan D Gibson
(74) *Attorney, Agent, or Firm* — Sughrue Mion, PLLC

(57) ABSTRACT

A method of operating an electronic device is provided. The electronic device includes a host device and a first storage device. The host device includes a processor and a baseboard management controller and the first storage device includes a first storage controller and a first micro controller. The method includes: performing a first monitoring operation to obtain first status information, by a baseboard management controller; determining whether a first abnormal situation occurs, based on the first status information, by the baseboard management controller; providing a first warning message to a first micro controller through a first communication interface based on determining that the first abnormal situation occurs, by the baseboard management controller, wherein the first communication interface is a direct communication interface between the baseboard management controller and the first micro controller; and performing a first preventive action based on the first warning message, by the first micro controller.

20 Claims, 12 Drawing Sheets

(56) References Cited

U.S. PATENT DOCUMENTS

| | | | |
|---|---|---|---|
| 11,403,163 B2* | 8/2022 | Muthiah | G06F 11/0772 |
| 11,520,656 B2* | 12/2022 | Bert | G06F 11/1068 |
| 11,599,410 B2* | 3/2023 | Koehler | G06F 11/0751 |
| 12,056,005 B2* | 8/2024 | Koehler | G06F 11/0751 |
| 2017/0091042 A1 | 3/2017 | Chou et al. | |
| 2017/0102889 A1 | 4/2017 | Lobo et al. | |
| 2020/0341926 A1 | 10/2020 | Tu et al. | |
| 2021/0149757 A1* | 5/2021 | Ozturk | G06F 11/0796 |
| 2021/0333850 A1 | 10/2021 | Chang et al. | |
| 2022/0114045 A1* | 4/2022 | Koehler | G06F 11/0793 |
| 2022/0188178 A1* | 6/2022 | Bert | G06F 11/0772 |
| 2022/0358006 A1* | 11/2022 | Jiang | G06F 1/266 |
| 2023/0069177 A1* | 3/2023 | Albright | G06F 11/3089 |
| 2023/0105565 A1 | 4/2023 | Risbud et al. | |
| 2023/0216607 A1* | 7/2023 | Ladkani | H04L 1/0036 |
| | | | 714/752 |
| 2023/0251924 A1* | 8/2023 | Koehler | G06F 11/0793 |
| | | | 714/2 |
| 2023/0267071 A1* | 8/2023 | Jeong | G06F 11/366 |
| | | | 714/38.11 |
| 2023/0418479 A1* | 12/2023 | Chodem | G06F 3/0655 |
| 2024/0211372 A1* | 6/2024 | Cudak | G06F 9/542 |
| 2024/0411637 A1* | 12/2024 | Lee | G06F 11/3034 |

\* cited by examiner

ELECTRONIC DEVICE PROVIDING WARNING MESSAGE THROUGH COMMUNICATION INTERFACE, AND METHOD OF OPERATING THE SAME

CROSS-REFERENCE TO RELATED APPLICATION

This application claims priority to Korean Patent Application No. 10-2023-0073560 filed on Jun. 8, 2023, in the Korean Intellectual Property Office, the disclosure of which is incorporated by reference herein in its entirety.

BACKGROUND

The present disclosure relates to a storage device, and more particularly, to an electronic device providing a warning message through a communication interface and a method of operating the same.

A memory device stores data in response to a write request and outputs data stored therein in response to a read request. For example, the memory device may be classified as a volatile memory device, which loses data stored therein when a power is turned off, such as a dynamic random access memory (DRAM) device or a static RAM (SRAM) device, or a non-volatile memory device, which retains data stored therein even when a power is turned off, such as a flash memory device, a phase-change RAM (PRAM), a magnetic RAM (MRAM), or a resistive RAM (RRAM).

The non-volatile memory device may be also referred to as a storage device, and may store a large amount of data. The storage device may communicate with a host device. The host device and the storage device may exchange user data through in-band communication. Also, the host device and the storage device may exchange hardware information such as temperature information, voltage information, current information, and humidity information. In the case of transmitting the hardware information through the in-band communication, the consumption of bandwidth may increase, and a transmission speed of user data may decrease. Accordingly, there is a need for a technique for efficiently transmitting the hardware information.

SUMMARY

One or more example embodiments provide an electronic device providing a warning message through a communication interface and a method of operating the same.

According to an aspect of an example embodiment, a method of operating an electronic device which includes a host device and a first storage device is provided. The host device includes a processor and a baseboard management controller and the first storage device includes a first storage controller and a first micro controller. The method includes: performing a first monitoring operation to obtain first status information, by the baseboard management controller; determining whether a first abnormal situation occurs, based on the first status information, by the baseboard management controller; providing a first warning message to the first micro controller through a first communication interface based on determining that the first abnormal situation occurs, by the baseboard management controller, wherein the first communication interface is a direct communication interface between the baseboard management controller and the first micro controller; and performing a first preventive action based on the first warning message, by the first micro controller.

According to an aspect of an example embodiment, a method of operating an electronic device which includes a host device and a storage device is provided. The host device includes a processor and a baseboard management controller and the storage device includes a storage controller and a micro controller. The method includes: performing a first monitoring operation to obtain first status information, by the micro controller; determining whether a first abnormal situation occurs, based on the first status information, by the micro controller; providing a first warning message to the baseboard management controller through a direct communication interface between the baseboard management controller and the micro controller, based on determining that the first abnormal situation occurs, by the baseboard management controller; and performing a first preventive action based on the first warning message, by the baseboard management controller.

According to an aspect of an example embodiment, an electronic device includes: a host device including a processor, a baseboard management controller, a cooling device, and a power supply device; and a storage device including a storage controller configured to directly communicate with the processor through a first communication interface, a micro controller configured to directly communicate with the baseboard management controller through a second communication interface different from the first communication interface, and a sensor device. The baseboard management controller is configured to: obtain first status information corresponding to a first monitoring operation for the cooling device or the power supply device; determine whether a first abnormal situation occurs, based on the first status information; and provide a first warning message to the micro controller through the second communication interface, based on determining that the first abnormal situation occurs. The micro controller is configured to: obtain second status information corresponding to a second monitoring operation for the sensor device; determine whether a second abnormal situation occurs, based on the second status information; and provide a second warning message to the baseboard management controller through the second communication interface, based on determining that the second abnormal situation occurs.

BRIEF DESCRIPTION OF DRAWINGS

The above and other aspects and features will be more apparent from the following description of example embodiments, taken in conjunction with the accompanying drawings, in which.

DETAILED DESCRIPTION

Below, example embodiments will be described with reference to the accompanying drawings.

Figure 1:
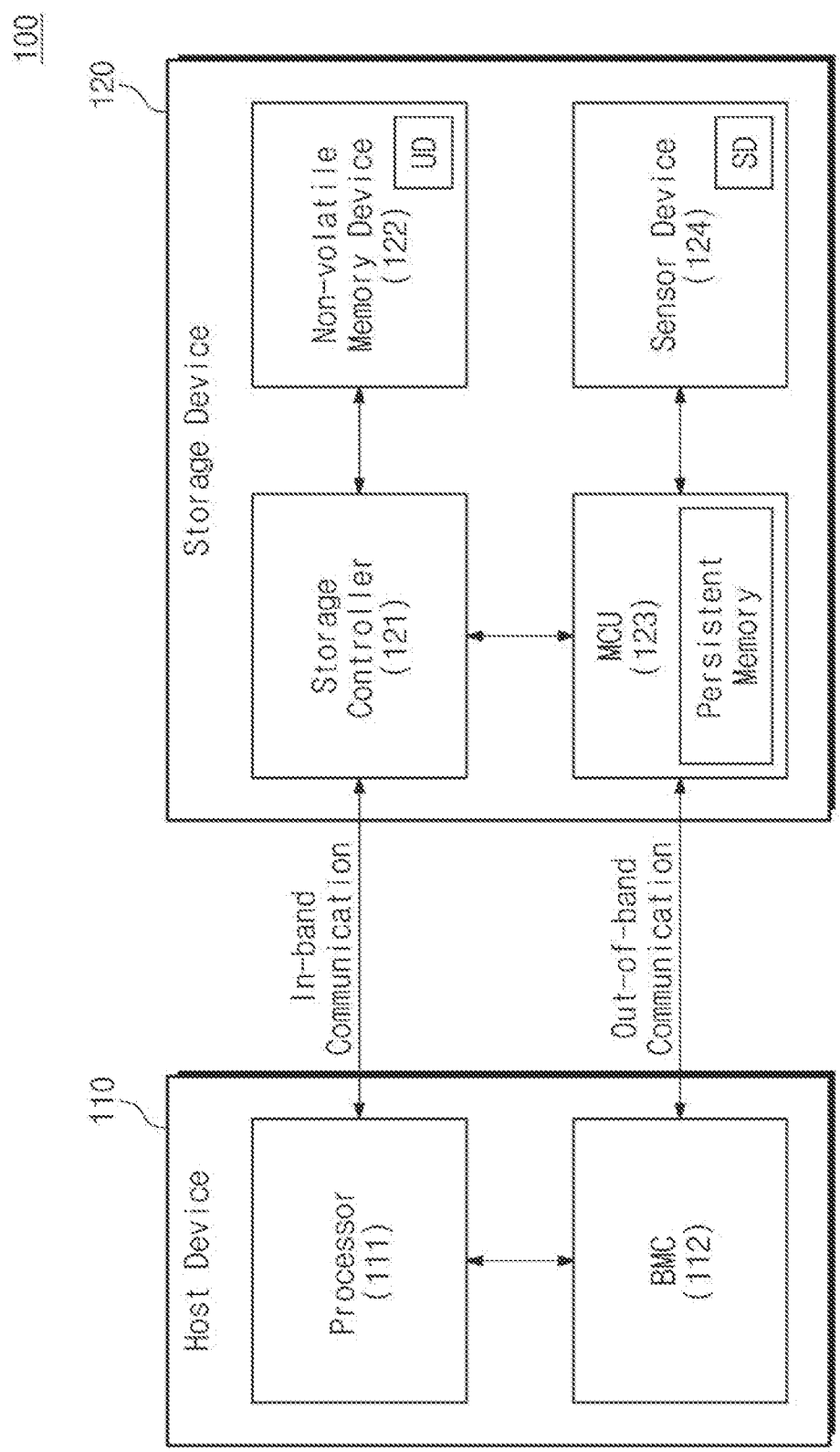
FIG. 1 is a block diagram of an electronic device according to an example embodiment.

FIG. 1 is a block diagram of an electronic device according to an example embodiment. Referring to FIG. 1, an electronic device 100 may include a host device 110 and a storage device 120. The electronic device 100 may refer to a device, which is configured to manage a large amount of user data UD, such as a storage system, a server system, or a database server. The user data UD may include a variety of information to be provided to the user, such as an image, a video, a text, and voice.

The host device 110 may control an overall operation of the electronic device 100. For example, the host device 110 may store the user data UD in the storage device 120, may read the user data UD stored in the storage device 120, or may manage hardware information of the storage device 120 which may be used to maintain the reliability of the user data UD stored in the storage device 120.

The hardware information may indicate characteristics of a physical environment of the electronic device 100. For example, the hardware information indicate sensed values of characteristics of the physical environment such as a temperature, a voltage, a current, and humidity, may include reliability information such as a program/erase (P/E) cycle, program count information, erase count information, read count information, error bit count information, and threshold voltage distribution information, or may include a result (e.g., a warning message according to a hardware failure) of analyzing the sensed values or the reliability information.

The host device 110 may include a processor 111 and a baseboard management controller (BMC) 112. The processor 111 and the BMC 112 may communicate with each other.

The processor 111 may control the user data UD to be stored in the storage device 120 or may control the user data UD stored in the storage device 120 to be read. For example, the processor 111 may be implemented with a central processing unit (CPU). The processor 111 may execute an operating system (OS), and the operating system may support in-band communication with the storage device 120. The in-band communication may use a direct communication interface between the processor 111 of the host device 110 and a storage controller 121 of the storage device 120, and may be compatible with the operating system (OS).

The BMC 112 may manage the hardware information of the storage device 120. For example, the BMC 112 may receive the hardware information from a micro controller unit (MCU) 123 or may provide the hardware information to the MCU 123. The BMC 112 may support out-of-band communication with the storage device 120. The out-of-band communication may use a direct communication interface between the BMC 112 of the host device 110 and the MCU 123 of the storage device 120, and may operate independently of the operating system (OS) executable by the processor 111 of the host device 110. The communication interface for the out-of-band communication may be provided independently of the communication interface for the in-band communication.

In some example embodiments, the communication interface for the out-of-band communication may support various protocols. For example, the communication interface for the out-of-band communication may include at least one of various kinds of protocols such as an Open Computer Project (OCP) standard, a Platform Level Data Model (PLDM) standard, a Network Controller Sideband Interface (NC-SI) standard, a Redfish standard, an Non-Volatile Memory Express Management Interface (NVMe_MI) standard, and a Management Component Transport Protocol (MCTP) standard.

The storage device 120 may include the storage controller 121, a non-volatile memory device 122, the MCU 123, and a sensor device 124.

The storage controller 121 may control an overall operation of the storage device 120 under control of the processor 111. For example, under control of the processor 111, the storage controller 121 may store the user data UD in the non-volatile memory device 122, may read the user data UD stored in the non-volatile memory device 122, or may communicate with the MCU 123. The storage controller 121 may be also referred to as a "main controller of the storage device 120". The storage controller 121 may support the in-band communication with the processor 111 of the host device 110.

In some example embodiments, the storage controller 121 may include a buffer memory. The buffer memory may be implemented with a volatile memory device, which loses data stored therein when a power is turned off, such as a static random access memory (SRAM), a dynamic random access memory (DRAM), and a synchronous dynamic random access memory (SDRAM). The buffer memory may buffer the user data UD received from the host device 110 and may provide the buffered user data UD to the non-volatile memory device 122. Alternatively, the buffer memory may buffer the user data UD received from the non-volatile memory device 122 and may provide the buffered user data UD to the host device 110.

The non-volatile memory device 122 may store the user data UD under control of the storage controller 121 or may provide the user data UD to the storage controller 121. In some example embodiments, the non-volatile memory device 122 may be a NAND flash memory device, but example embodiments are not limited thereto. For example, the non-volatile memory device 122 may be one of various storage devices, which retain data stored therein even when a power is turned off, such as a phase-change random access memory (PRAM), a magnetic random access memory (MRAM), a resistive random access memory (RRAM), and a ferroelectric random access memory (FRAM).

The MCU 123 may manage the hardware information of the storage device 120. The MCU 123 may include a persistent memory. For example, the persistent memory may be implemented with an electrically erasable programmable read-only memory (EEPROM). The persistent memory may store the hardware information or may store user data buffered in the storage controller 121 when an abnormal situation occurs. The abnormal situation may indicate a state where a physical defect occurs in the terms of hardware, such as a state where a temperature is high or a state where a driving voltage is lower than a designed (i.e., threshold) voltage. The MCU 123 may communicate with the storage controller 121 and the sensor device 124. The MCU 123 may support the out-of-band communication with the BMC 112 of the host device 110.

The sensor device 124 may sense characteristics of a physical environment of the storage device 120 and may generate sensor data SD. The sensor data SD may include a sensed temperature value obtained by sensing an internal temperature of the storage device 120. The sensor data SD may include a sensed voltage level of a power supply voltage received from the host device 110. The sensor device 124 may provide the sensor data SD to the MCU 123. The MCU 123 may manage the hardware information of the storage device 120, based on the sensor data SD.

In some example embodiments, the BMC 112 may determine whether the abnormal situation occurs (i.e., is currently occurring), based on an internal monitoring operation of the host device 110. For example, the host device 110 may further include a cooling device for cooling the storage device 120 and a power supply device. The BMC 112 may determine whether the abnormal situation occurs in the host device 110, by monitoring the cooling device or the power supply device periodically.

When it is determined that the abnormal situation does not occur (i.e., is not currently occurring), the BMC 112 may continuously perform the monitoring operation. When it is determined that the abnormal situation occurs (i.e., is currently occurring), the BMC 112 may provide a warning message to the MCU 123 through the out-of-band communication. The warning message may be a signal providing notification that the abnormal situation occurs. The MCU 123 may perform a preventive action based on the warning message. The preventive action may include operations for preventing damage (e.g., the occurrence of an uncorrectable error) of the user data UD stored in the storage device 120 or preventing physical damage to hardware of the storage device 120. For example, the preventive action of the MCU 123 may include adjusting a driving voltage level or a driving frequency of the storage device 120 or backing up the user data UD buffered in the storage controller 121.

In some example embodiments, the MCU 123 may determine whether the abnormal situation occurs, based on the monitoring operation of the sensor device 124. For example, the MCU 123 may obtain the sensor data SD of the sensor device 124 by monitoring the sensor device 124 periodically. The MCU 123 may determine whether the abnormal situation occurs in the storage device 120, based on the sensor data SD.

When it is determined that the abnormal situation does not occur, the MCU 123 may continuously perform the monitoring operation. When it is determined that the abnormal situation occurs, the MCU 123 may provide a warning message to the BMC 112 through the out-of-band communication. The warning message may be a signal providing notification that the abnormal situation occurs. The BMC 112 may perform a preventive action for preventing damage in terms of hardware, based on the warning message. For example, the preventive action of the BMC 112 may include increasing a driving level of the cooling device for cooling the storage device 120 or transmitting a warning message to the processor 111.

As described above, according to an example embodiment, the electronic device 100 may include the BMC 112 and the MCU 123 specialized for the hardware information. Each of the BMC 112 and the MCU 123 may determine whether the abnormal situation occurs in the electronic device 100, and when the abnormal situation occurs, the BMC 112 or the MCU 123 may transmit the warning message to the MCU 123 or the BMC 112 by using the out-of-band communication. As the warning message associated with the hardware failure is transmitted by using the out-of-band communication instead of the in-band communication, the electronic device 100 may quickly sense the hardware failure and may perform the preventive action in real time (e.g., with a low time delay). Also, because the warning message is transmitted through the out-of-band communication, the electronic device 100 may suppress, due to the management of the hardware information, the consumption of the bandwidth of the in-band communication and a decrease in a data transfer rate of the in-band communication.

Figure 2:
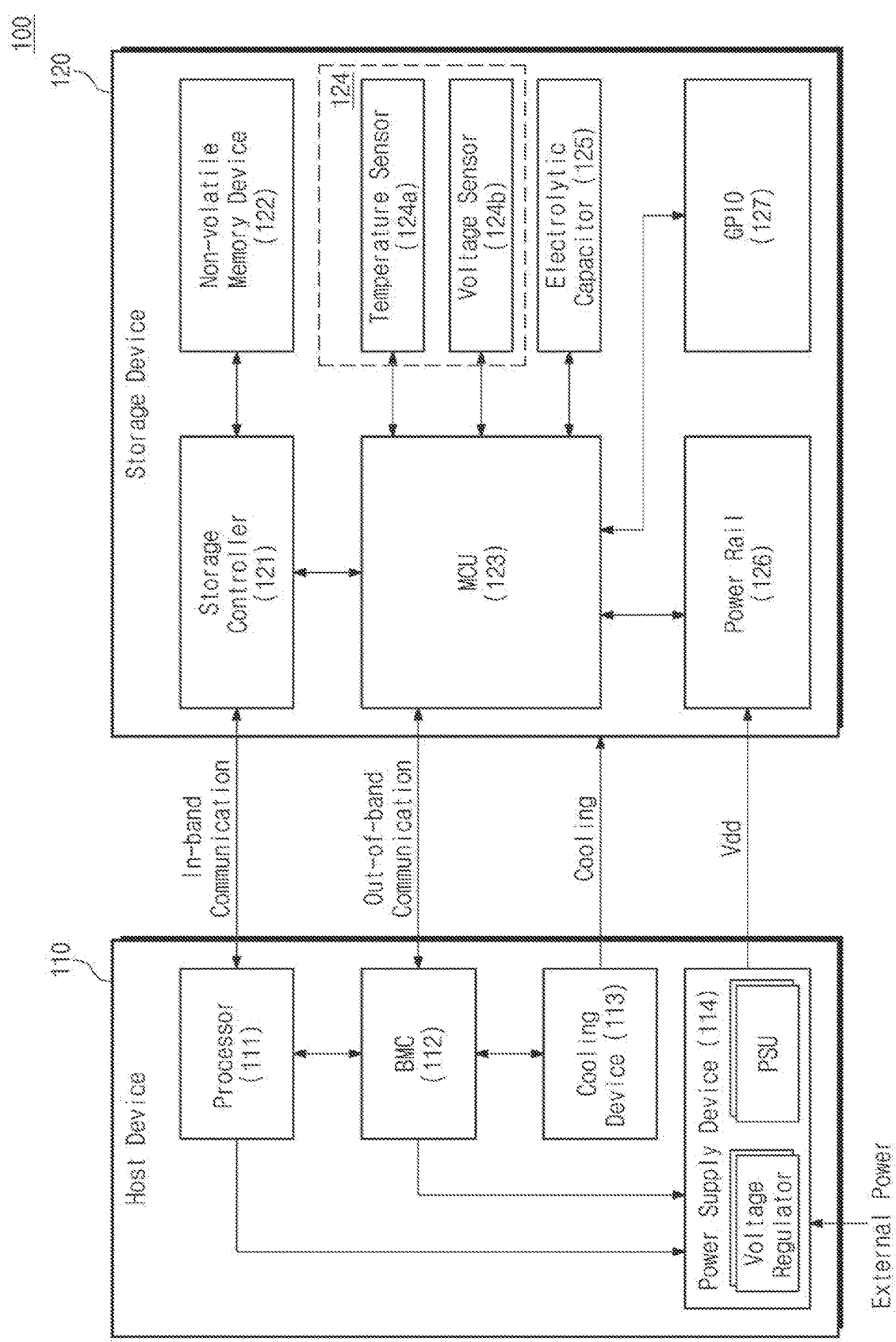
FIG. 2 is a block diagram illustrating an electronic device of FIG. 1 in detail, according to some example embodiments.

FIG. 2 is a block diagram illustrating an electronic device of FIG. 1 in detail, according to some example embodiments. Referring to FIG. 2, the electronic device 100 may include the host device 110 and the storage device 120. The host device 110 may include the processor 111, the BMC 112, a cooling device 113, and a power supply device 114. The processor 111 and the BMC 112 are similar to the processor 111 and the BMC 112 of FIG. 1, and thus, additional description will be omitted to avoid redundancy.

The cooling device 113 may cool the storage device 120 under control of the BMC 112. For example, the BMC 112 may periodically monitor for the failure or abnormal operation of the cooling device 113. The BMC 112 may control the driving level of the cooling device 113. For example, as the driving level of the cooling device 113 increases, the cooling device 113 may cool the storage device 120 more quickly (i.e., more strongly). In contrast, as the driving level of the cooling device 113 decreases, the cooling device 113 may cool the storage device 120 more slowly (i.e., more weakly).

The cooling device 113 may be a fan device for physically providing air of a low temperature to flow to the storage device 120. However, example embodiments are not limited thereto. For example, the cooling device 113 may be implemented to cool the storage device 120 in a liquid cooling method, and in this regard may control a flow of liquid.

The power supply device 114 may generate a power supply voltage Vdd based on an external power and may provide the power supply voltage Vdd to the storage device 120. The power supply voltage Vdd may be used to drive the storage device 120. The BMC 112 may periodically monitor for the failure or abnormal operation of the power supply device 114. When the BMC 112 detects the failure or abnormal operation of the power supply device 114 through the monitoring, the BMC 112 may provide the warning messages to the processor 111 and the storage device 120.

The processor 111 may provide warning messages to other components in the host device 110 (e.g., messages for providing notification that the power is abnormally supplied or warning the other components that the power is abnormally supplied), based on the warning message. The storage device 120 may perform the preventive action based on the warning message.

The power supply device 114 may include a plurality of voltage regulators and a plurality of power supply circuits. At least some of the plurality of power supply circuits may be redundant power supply circuits. Each of the plurality of power supply circuits may receive an external power (i.e., an external voltage), may generate an internal power (i.e., an internal voltage) based on the external power, and may provide the internal power to a relevant voltage regulator. The relevant voltage regulator may generate a power supply voltage by adjusting the internal power and may provide the power supply voltage to relevant components.

For example, the power supply circuit of the power supply device 114 may receive an AC power supply voltage of 220 V as an external power, may generate a DC power supply voltage of 12 V as an internal power, and may provide the internal power to a first voltage regulator. The first voltage regulator may generate the power supply voltage Vdd of about 12 V, about 5 V, or about 3.3 V based on the internal power and may provide the power supply voltage Vdd to a power rail 126 of the storage device 120. The voltage level of the power supply voltage Vdd may be variously changed or modified depending on the standard of the storage device 120.

As another example, the power supply circuit of the power supply device 114 may receive an AC power supply voltage of 220 V as the external power, may generate a DC power supply voltage of 12 V as the internal power, and may provide the internal power to a second voltage regulator. The second voltage regulator may generate a processor power supply voltage of about 1.2 V or about 0.9 V based on the internal power and may provide the processor power supply voltage to the processor 111. The voltage level of the processor power supply voltage may be variously changed or modified depending on the standard of the processor 111.

As another example, the power supply circuit of the power supply device 114 may receive an AC power supply voltage of 220 V as external power, may generate a DC power supply voltage of 12 V as the internal power, and may provide the internal power to a third voltage regulator. The third voltage regulator may generate a BMC power supply voltage of about 3.3 V or about 1.8 V based on the internal power and may provide the BMC power supply voltage to the BMC 112. The voltage level of the BMC power supply voltage may be variously changed or modified depending on the standard of the BMC 112.

The storage device 120 may include the storage controller 121, the non-volatile memory device 122, the MCU 123, the sensor device 124, an electrolytic capacitor 125, the power rail 126, and a general purpose input/output (GPIO) circuit 127. The storage controller 121, the non-volatile memory device 122, and the MCU 123 are similar to the storage controller 121, the non-volatile memory device 122, and the MCU 123 of FIG. 1, and thus, additional description will be omitted to avoid redundancy.

The sensor device 124 may include a temperature sensor 124a and a voltage sensor 124b. The temperature sensor 124a may sense an internal temperature of the storage device 120. The MCU 123 may receive a sensed temperature value indicating a temperature periodically sensed by the temperature sensor 124a, may compare the sensed temperature value and a threshold temperature value, and may determine whether the abnormal situation occurs, based on a comparison result. The threshold temperature value may indicate a value exceeding a designed temperature range of the storage device 120 and may be used to determine a high-temperature situation.

The voltage sensor 124b may sense the voltage level of the power supply voltage Vdd received from the power supply device 114 through the power rail 126. The voltage level of the power supply voltage Vdd may fluctuate due to various factors such as the failure of the host device 110, damage of a power supply line for receiving the power supply voltage Vdd, and the degradation of the storage device 120. The MCU 123 may receive a sensed voltage level indicating a voltage level periodically sensed by the voltage sensor 124b, may compare the sensed voltage level and a threshold voltage level, and may determine whether the abnormal situation occurs, based on a comparison result.

The threshold voltage level may indicate a voltage level of a designed voltage range of the storage device 120 and may be used to determine a low-voltage or abnormal voltage situation.

The electrolytic capacitor 125 may store charges based on at least a portion of the power supply voltage Vdd received through the power rail 126 or may discharge the stored charges to any other components of the storage device 120. The electrolytic capacitor 125 may include an anode, a cathode, and an electrolytic between the anode and the cathode. The lifetime or performance of the electrolytic capacitor 125 may be reduced due to various factors such as an elapsed time, excessive charging, and a high temperature. The MCU 123 may monitor the lifetime or performance of the electrolytic capacitor 125 periodically and thus may determine whether the abnormal situation associated with the electrolytic capacitor 125 occurs.

The power rail 126 may receive the power supply voltage Vdd from the power supply device 114 of the host device 110. The power rail 126 may provide the power supply voltage Vdd to the MCU 123 or any other components of the storage device 120. The MCU 123 may monitor a physical state of the power rail 126 periodically and thus may determine whether the abnormal situation associated with the power rail 126 occurs.

The GPIO circuit 127 may include pins for transmitting general-purpose input/output signals. The GPIO circuit 127 may be connected to the MCU 123. The MCU 123 may monitor a physical state of the GPIO circuit 127 itself or a physical state of an electrical signal transmitted through the GPIO circuit 127 periodically and thus may determine whether the abnormal situation associated with the GPIO circuit 127 occurs.

Figure 3:
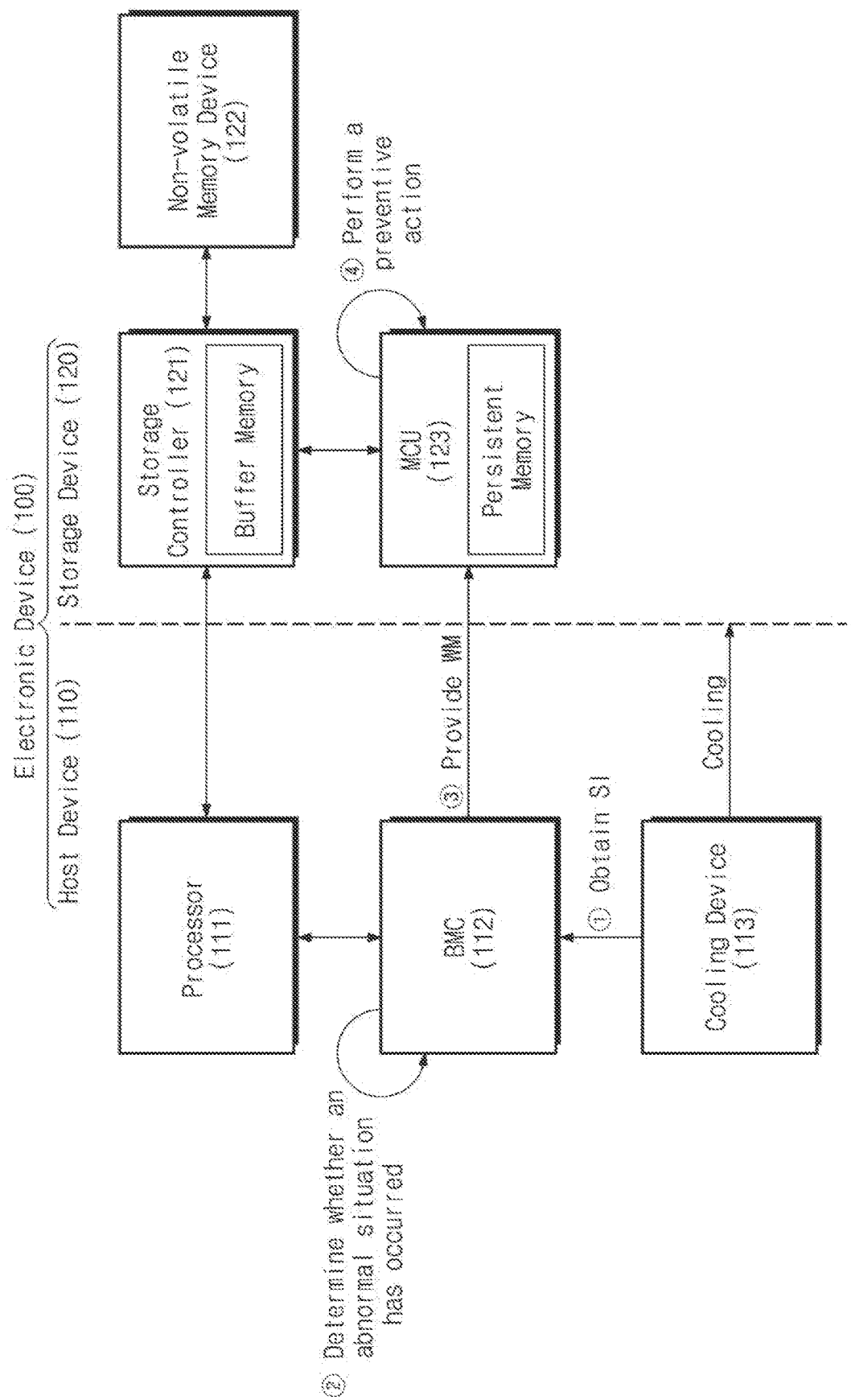
FIG. 3 is a diagram describing a method of operating an electronic device according to some example embodiments.

FIG. 3 is a diagram describing a method of operating an electronic device according to some example embodiments. Referring to FIG. 3, the electronic device 100 may include the host device 110 and the storage device 120. The host device 110 may include the processor 111, the BMC 112, and the cooling device 113. The storage device 120 may include the storage controller 121, the non-volatile memory device 122, and the MCU 123. The storage controller 121 may include a buffer memory. The MCU 123 may include a persistent memory.

The processor 111 and the storage controller 121 may communicate with each other through the direct communication interface. The processor 111 and the storage controller 121 may support the in-band communication.

The BMC 112 and the MCU 123 may communicate with each other through the direct communication interface. The BMC 112 and the MCU 123 may support the out-of-band communication.

Below, a method in which the electronic device 100 operates based on the monitoring of the cooling device 113 of the host device 110 will be described.

In a first operation ①, the BMC 112 may obtain status information SI by monitoring the cooling device 113. The cooling device 113 may cool the storage device 120 under control of the BMC 112. The status information SI may include operation state information of the cooling device 113. The operation state information may indicate whether the failure occurs in the cooling device 113 or may indicate whether the cooling device 113 operates abnormally (e.g., whether a level of air flowing due to a fan device is weaker than a designed level).

In a second operation ②, the BMC 112 may determine whether the abnormal situation occurs, based on the status information SI. The abnormal situation may indicate the failure or abnormal operation of the cooling device 113. When it is determined that the abnormal situation does not occur, the BMC 112 may continuously perform the monitoring operation. When the BMC 112 determines that the abnormal situation occurs, the BMC 112 may generate a warning message WM for notifying the MCU 123 of the abnormal situation.

In a third operation ③, the BMC 112 may provide the warning message WM to the MCU 123. In detail, in response to determining that the abnormal situation occurs, the BMC 112 may provide the warning message WM to the MCU 123 through the direct communication interface between the BMC 112 and the MCU 123. The direct communication interface between the BMC 112 and the MCU 123 may support the out-of-band communication.

In a fourth operation ④, the MCU 123 may perform the preventive action based on the warning message WM. For example, the preventive action of the MCU 123 may include adjusting a driving voltage level or a driving frequency level of the storage device 120 for heat management. As another example, the preventive action of the MCU 123 may back up user data buffered in the storage controller 121 for the purpose of preventing the loss of user data being currently processed depending the read operation or the write operation.

In some example embodiments, the preventive action of the MCU 123 may include entering a dynamic thermal throttling (DTT) operation. The DTT operation may refer to an operation of dynamically increasing or decreasing the driving voltage level or the driving frequency level such that a data processing speed is optimized within a limited temperature range. The persistent memory of the MCU 123 may store instructions for the DTT operation. The MCU 123 may enter the DTT operation by executing the instructions stored in the persistent memory based on the warning message WM.

In some example embodiments, the preventive action of the MCU 123 may include dumping user data being processed to the non-volatile memory device 122. For example, while the buffer memory of the storage controller 121 buffers user data depending on the read operation or the write operation, the MCU 123 may receive the warning message WM from the BMC 112. The MCU 123 may provide a backup request to the storage controller 121 based on the warning message WM. The storage controller 121 may store the user data buffered in the buffer memory in the non-volatile memory device 122, based on the backup request.

In some example embodiments, the preventive action of the MCU 123 may include dumping user data being processed to the persistent memory of the MCU 123. For example, while the buffer memory of the storage controller 121 buffers user data depending on the read operation or the write operation, the MCU 123 may receive the warning message WM from the BMC 112. The MCU 123 may provide the backup request to the storage controller 121 based on the warning message WM. The storage controller 121 may store the user data buffered in the buffer memory in the persistent memory of the MCU 123, based on the backup request.

Figure 4:
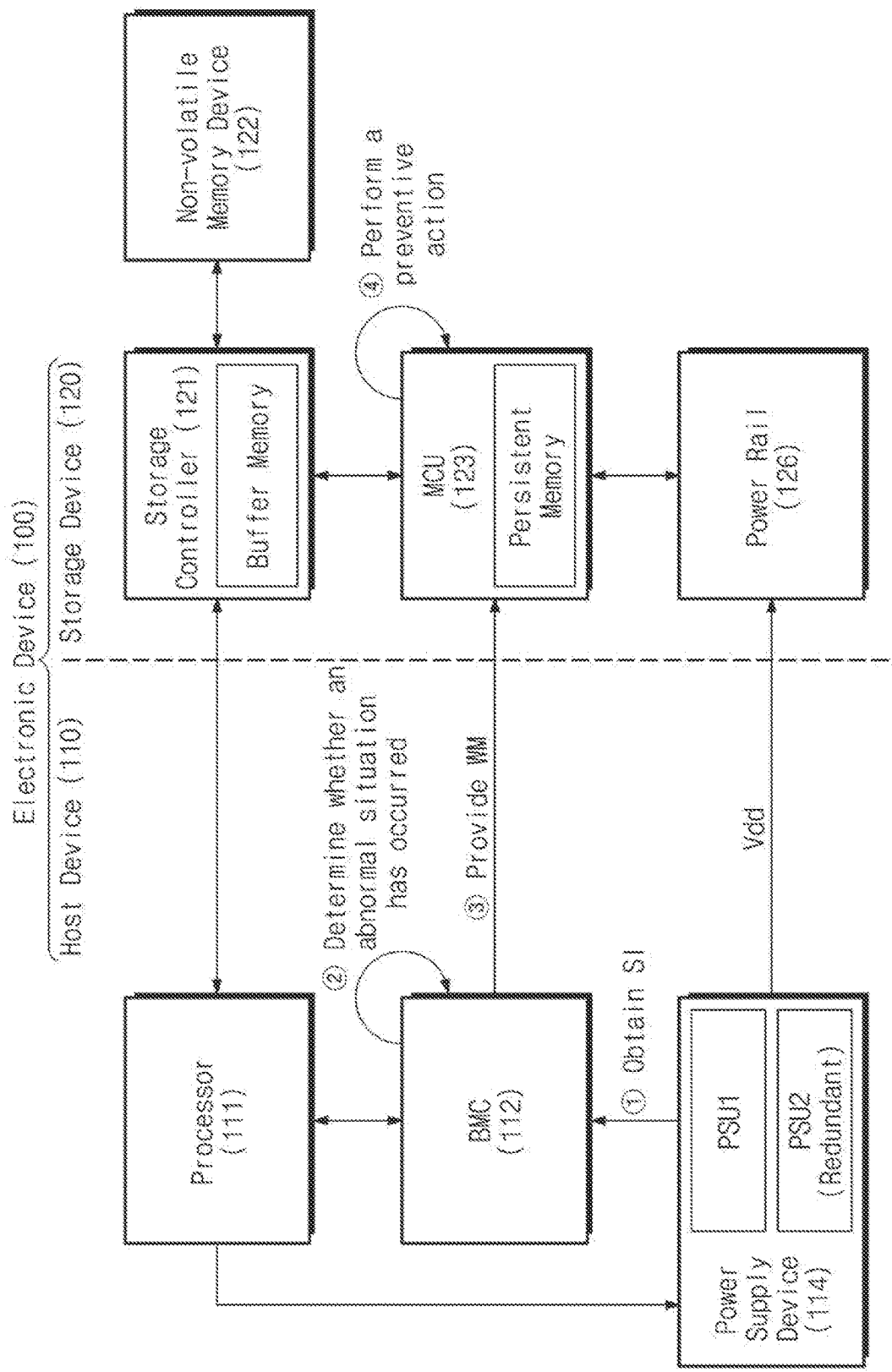
FIG. 4 is a diagram describing a method of operating an electronic device according to some example embodiments.

FIG. 4 is a diagram describing a method of operating an electronic device according to some example embodiments. Referring to FIG. 4, the electronic device 100 may include the host device 110 and the storage device 120. The host device 110 may include the processor 111, the BMC 112, and the power supply device 114. The storage device 120 may include the storage controller 121, the non-volatile memory device 122, the MCU 123, and the power rail 126. The power supply device 114 may include a first power supply circuit PSU1 and a second power supply circuit PSU2. The storage controller 121 may include a buffer memory. The MCU 123 may include a persistent memory.

The processor 111 and the storage controller 121 may communicate with each other through the direct communication interface. The processor 111 and the storage controller 121 may support the in-band communication.

The BMC 112 and the MCU 123 may communicate with each other through the direct communication interface. The BMC 112 and the MCU 123 may support the out-of-band communication.

Below, a method in which the electronic device 100 operates based on the monitoring of the power supply device 114 of the host device 110 will be described.

In a first operation ①, the BMC 112 may obtain the status information SI by monitoring the power supply device 114. The power supply device 114 may provide the power supply voltage Vdd to the power rail 126 by using the first power supply circuit PSU1 and the second power supply circuit PSU2. The second power supply circuit PSU2 may be a redundant power supply circuit. For example, when the second power supply circuit PSU2 fails, the first power supply circuit PSU1 may normally provide the power supply voltage Vdd to the power rail 126. However, afterwards, when the first power supply circuit PSU1 fails, a sudden power off (SPO) event may occur in the storage device 120. That is, the failure of the redundant power supply circuit may indicate a situation where the probability that the SPO event occurs is high.

The status information SI may include operation state information of the power supply device 114. The operation state information may indicate whether the failure occurs in the power supply device 114 or may indicate whether the power supply device 114 operates abnormally. The abnormal operation of the power supply device 114 may include the failure or abnormal operation of the redundant power supply circuit in the power supply device 114.

In a second operation ②, the BMC 112 may determine whether the abnormal situation occurs, based on the status information SI. The abnormal situation may indicate the failure or abnormal operation of the power supply device 114. When it is determined that the abnormal situation does not occur, the BMC 112 may continuously perform the monitoring operation. When the BMC 112 determines that the abnormal situation occurs, the BMC 112 may generate the warning message WM for notifying the MCU 123 of the abnormal situation.

In a third operation ③, the BMC 112 may provide the warning message WM to the MCU 123. In detail, in response to determining that the abnormal situation occurs, the BMC 112 may provide the warning message WM to the MCU 123 through the direct communication interface between the BMC 112 and the MCU 123. The direct communication interface between the BMC 112 and the MCU 123 may support the out-of-band communication.

In a fourth operation ④, the MCU 123 may perform the preventive action based on the warning message WM. For example, the preventive action of the MCU 123 may back up user data buffered in the storage controller 121 for the purpose of preventing the loss of user data being currently processed depending the read operation or the write operation.

In some example embodiments, the preventive action of the MCU 123 may include dumping user data being processed to the non-volatile memory device 122 or the persistent memory of the MCU 123. For example, while the buffer memory of the storage controller 121 buffers user data, the MCU 123 may receive the warning message WM from the BMC 112. The MCU 123 may provide the backup request to the storage controller 121 based on the warning message WM. The storage controller 121 may store the user data buffered in the buffer memory in the non-volatile memory device 122 or the MCU 123, based on the backup request.

Figure 5:
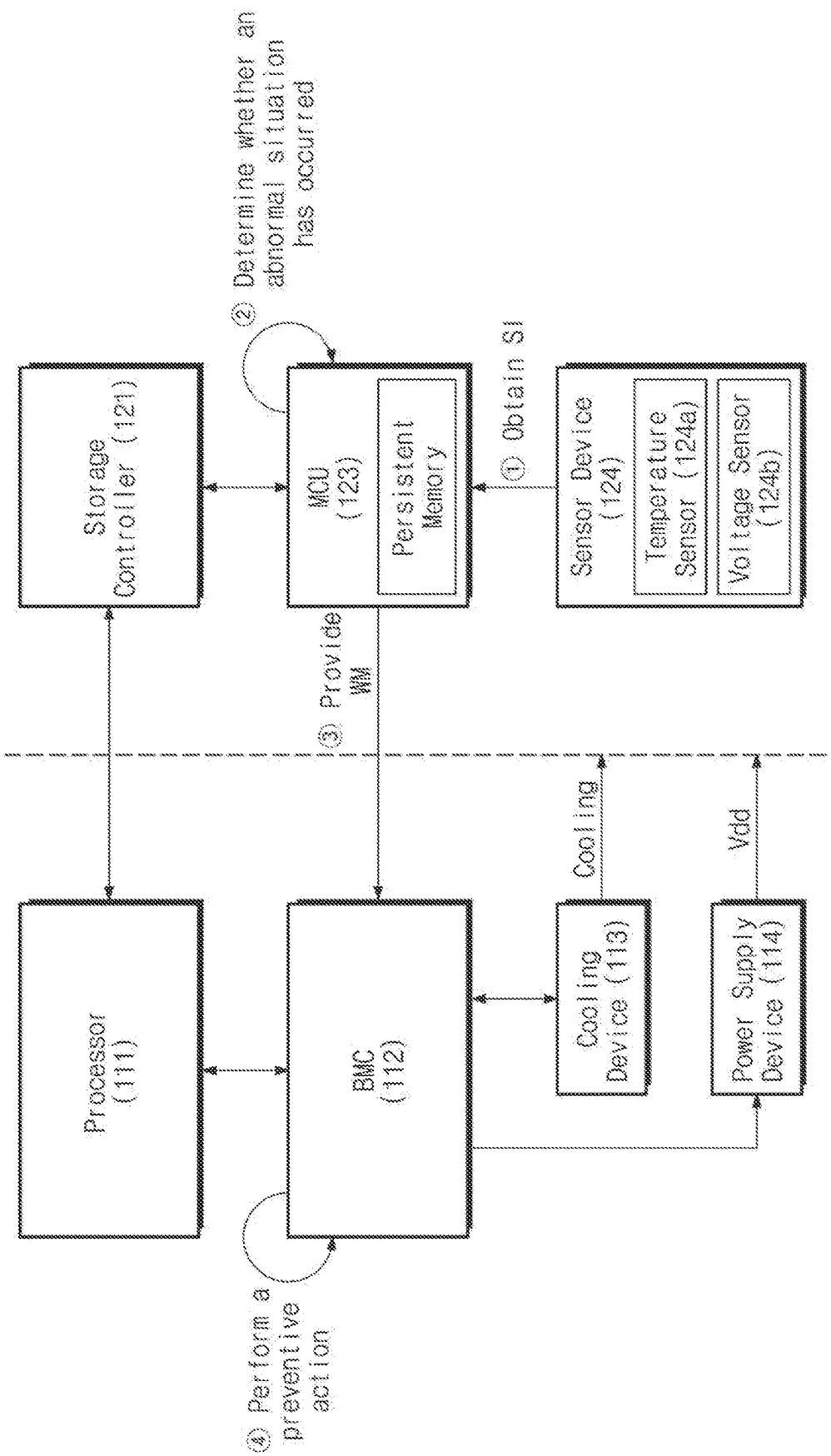
FIG. 5 is a diagram describing a method of operating an electronic device according to some example embodiments.

FIG. 5 is a diagram describing a method of operating an electronic device according to some example embodiments. Referring to FIG. 5, the electronic device 100 may include the host device 110 and the storage device 120. The host device 110 may include the processor 111, the BMC 112, the cooling device 113, and the power supply device 114. The storage device 120 may include the storage controller 121, the MCU 123, and the sensor device 124. The MCU 123 may include a persistent memory. The sensor device 124 may include the temperature sensor 124a and the voltage sensor 124b.

The processor 111 and the storage controller 121 may communicate with each other through the direct communication interface. The processor 111 and the storage controller 121 may support the in-band communication.

The BMC 112 and the MCU 123 may communicate with each other through the direct communication interface. The BMC 112 and the MCU 123 may support the out-of-band communication.

Below, a method in which the electronic device 100 operates based on the monitoring of the sensor device 124 of the storage device 120 will be described.

In a first operation ①, the MCU 123 may obtain the status information SI by the monitoring operation of the sensor device 124. The temperature sensor 124a of the sensor device 124 may sense the internal temperature of the storage device 120 and may generate a sensed temperature value. The voltage sensor 124b of the sensor device 124 may sense the power supply voltage Vdd received from the power supply device 114 and may generate a sensed voltage level. The status information SI may include the sensed temperature value indicating a temperature sensed by the temperature sensor 124a or the sensed voltage level indicating a voltage level sensed by the voltage sensor 124b.

In a second operation ②, the MCU 123 may determine whether the abnormal situation occurs, based on the status information SI. The persistent memory of the MCU 123 may store instructions corresponding to an algorithm that is used to determine whether the abnormal situation occurs. As the MCU 123 executes the instructions of the persistent memory, the MCU 123 may receive the status information SI from the sensor device 124 periodically and may determine whether the abnormal situation occurs, based on the status information SI and the instructions. When it is determined that the abnormal situation does not occur, the MCU 123 may continuously perform the monitoring operation. When the MCU 123 determines that the abnormal situation occurs, the BMC 112 may generate the warning message WM for notifying the BMC 112 of the abnormal situation.

In some example embodiments, the MCU 123 may sense an abnormal situation associated with a temperature. In detail, the status information SI may include a sensed temperature value. The MCU 123 may compare the sensed temperature value and the threshold temperature value based on the status information SI and the instructions stored in the persistent memory, and when the sensed temperature value is greater than the threshold temperature value, the MCU 123 may generate the warning message WM. That is, the abnormal situation may indicate a high-temperature situation, and the abnormal situation may indicate that the sensed temperature value is greater than the threshold temperature value.

In some example embodiments, the MCU 123 may sense an abnormal situation associated with a voltage. In detail, the status information SI may include a sensed voltage level. The MCU 123 may compare the sensed voltage level and the threshold voltage level based on the status information SI and the instructions stored in the persistent memory, and when the sensed voltage level is lower than the threshold voltage level, the MCU 123 may generate the warning message WM. That is, the abnormal situation may indicate a low-voltage or abnormal voltage situation, and the abnormal situation may indicate that the sensed voltage level is lower than the threshold voltage level.

In a third operation ③, the MCU 123 may provide the warning message WM to the BMC 112. In detail, in response to determining that the abnormal situation occurs, the MCU 123 may provide the warning message WM to the BMC 112 through the direct communication interface between the BMC 112 and the MCU 123. The direct communication interface between the BMC 112 and the MCU 123 may support the out-of-band communication.

In some example embodiments, the warning message WM may indicate the abnormal situation associated with the temperature, may indicate the abnormal situation associated with the voltage, or may indicate the abnormal situation associated with both the temperature and the voltage.

In a fourth operation ④, the BMC 112 may perform the preventive action based on the warning message WM. For example, when the warning message WM indicates the abnormal situation associated with the temperature, the preventive action of the BMC 112 may include increasing the driving level of the cooling device 113 for heat management. As another example, when the warning message WM indicates the abnormal situation associated with the voltage, the preventive action of the BMC 112 may include transmitting, at the BMC 112, a warning message to the processor 111 and transmitting, at the processor 111, a relevant warning message to each of the remaining components of the host device 110 based on the warning message.

Figure 6:
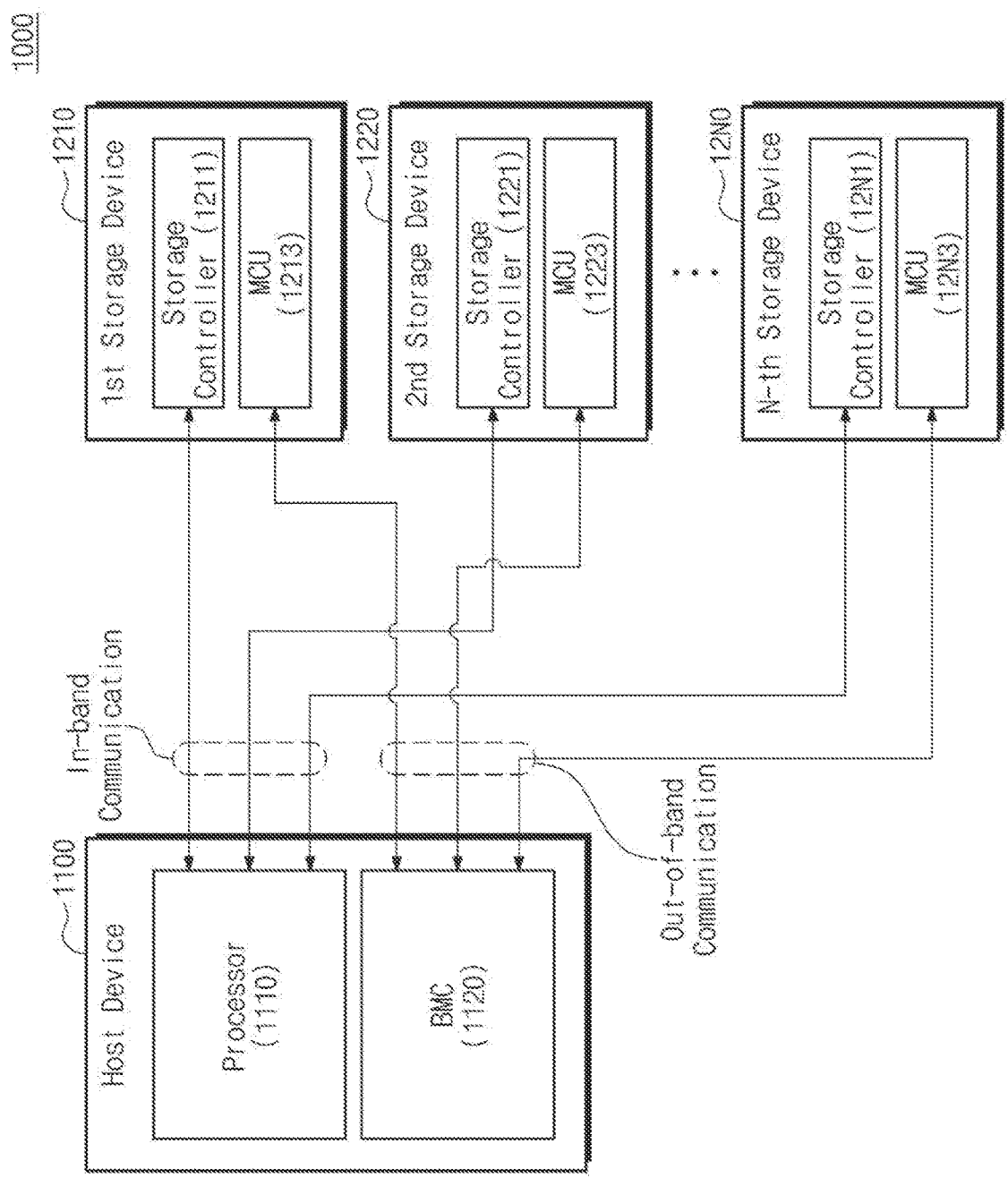
FIG. 6 is a diagram describing an electronic device in a multi-storage environment, according to some example embodiments.

FIG. 6 is a diagram describing an electronic device in a multi-storage environment, according to some example embodiments. Referring to FIG. 6, an electronic device 1000 may be implemented in a multi-storage environment. The multi-storage environment may refer to an environment in which a plurality of storage devices are used. The electronic device 1000 may include a host device 1100 and a plurality of storage devices 1210 to 12N0. The plurality of storage devices 1210 to 12N0 may be also referred to as "N storage devices". Herein "N" is a natural number greater than 1.

The host device 1100 may support the in-band communication and the out-of-band communication for each of the plurality of storage devices 1210 to 12N0.

The host device 1100 may include a processor 1110 and a BMC 1120. The processor 1110 and the BMC 1120 may respectively correspond to the processor 111 and the BMC 112 of FIG. 1.

The first storage device 1210 may include a storage controller 1211 and an MCU 1213. The storage controller 1211 and the MCU 1213 may respectively correspond to the storage controller 121 and the MCU 123 of FIG. 1. The processor 1110 of the host device 1100 and the storage controller 1211 of the first storage device 1210 may directly communicate with each other through a first communication interface supporting the in-band communication. The BMC 1120 of the host device 1100 and the MCU 1213 of the first storage device 1210 may directly communicate with each other through a second communication interface supporting the out-of-band communication.

As in the above description, the second storage device 1220 may include a storage controller 1221 and an MCU 1223. The storage controller 1221 and the MCU 1223 may be similar to the storage controller 1211 and the MCU 1213, respectively. The processor 1110 and the storage controller 1221 may directly communicate with each other through a third communication interface supporting the in-band communication. The BMC 1120 and the MCU 1223 may directly communicate with each other through a fourth communication interface supporting the out-of-band communication.

Likewise, the N-th storage device 12N0 may include a storage controller 12N1 and an MCU 12N3. The storage controller 12N1 and the MCU 12N3 may be similar to the storage controller 1211 and the MCU 1213, respectively. The processor 1110 and the storage controller 12N1 may directly communicate with each other through a communication interface supporting the in-band communication. The BMC 1120 and the MCU 12N3 may directly communicate with each other through a communication interface supporting the out-of-band communication.

Figure 7:
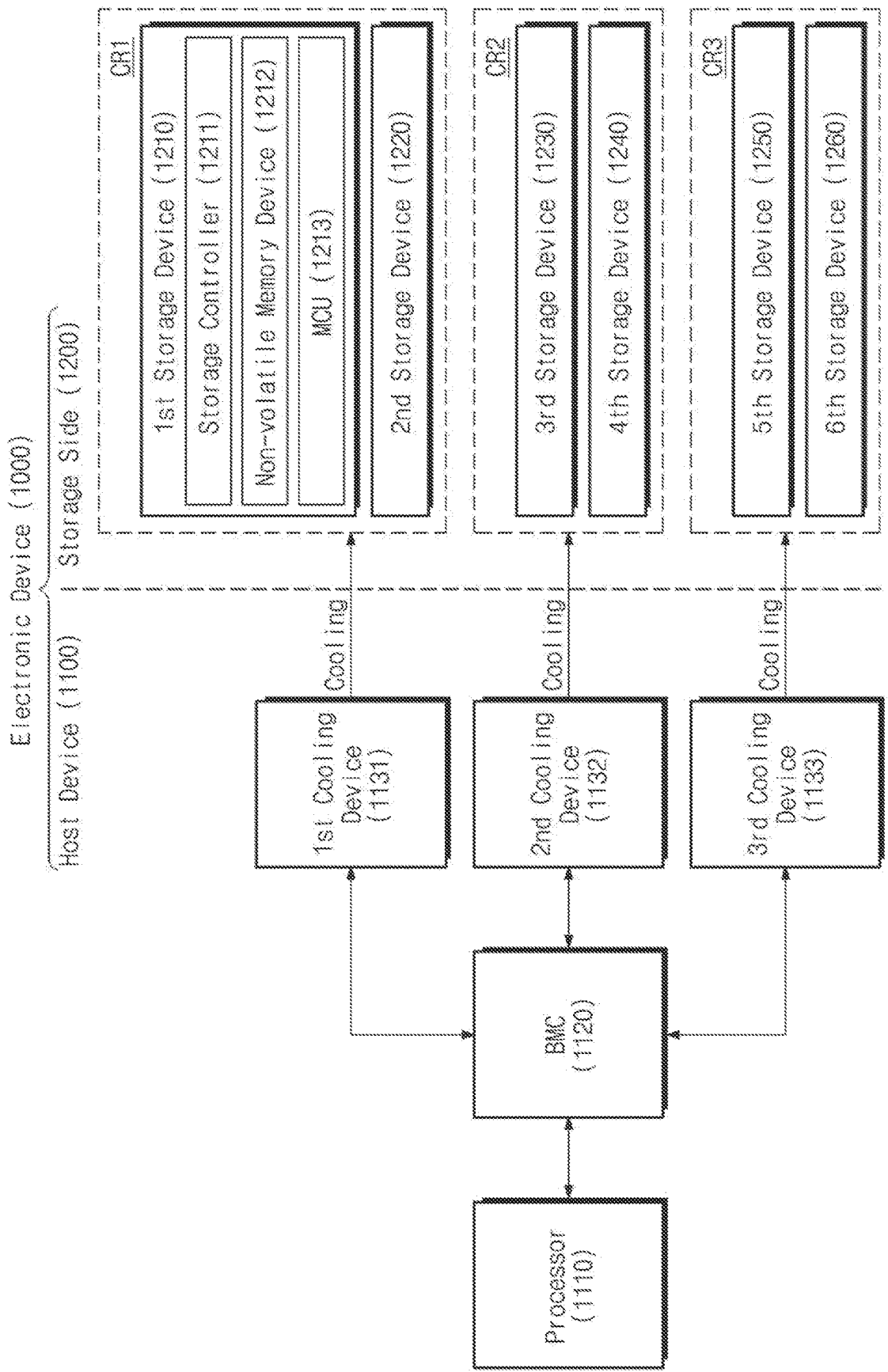
FIG. 7 is a block diagram illustrating an electronic device of FIG. 6 in detail, according to some example embodiments.

FIG. 7 is a block diagram illustrating an electronic device of FIG. 6 in detail, according to some example embodiments. Referring to FIG. 7, the electronic device 1000 may include the host device 1100 and a storage side 1200. The host device 1100 may include the processor 1110, the BMC 1120, and first to third cooling devices 1131 to 1133. The storage side 1200 may include the first to sixth storage devices 1210 to 1260.

The first storage device 1210 may include the storage controller 1211, a non-volatile memory device 1212, and the MCU 1213. The storage controller 1211 and the processor 1110 may directly communicate with each other through the in-band communication. The BMC 1120 and the MCU 1213 may directly communicate with each other through the out-of-band communication. As in the above description, each of the second to sixth storage devices 1220 to 1260 may include a corresponding storage controller, a corresponding non-volatile memory device, and a corresponding MCU.

The first cooling device 1131 may cool the first and storage devices 1210 and 1220 disposed in a first cooling region CR1 under control of the BMC 1120. The influence of a cooling operation of the first cooling device 1131 on second and third cooling regions CR2 and CR3 may be small. For example, the first cooling device 1131 may be implemented with a fan device, and the first cooling region CR1 may indicate a physical space where the cold air flowing due to the first cooling device 1131 is directed. For better understanding, the first cooling region CR1 is illustrated as including the first and second storage devices 1210 and 1220, but one cooling region may include various numbers of storage devices, for example one cooling region may include more than two storage devices or less than two storage devices.

As in the above description, the second cooling device 1132 may cool the third and fourth storage devices 1230 and 1240 disposed in a second cooling region CR2 under control of the BMC 1120. The third cooling device 1133 may cool the fifth and sixth storage devices 1250 and 1260 disposed in a third cooling region CR3 under control of the BMC 1120.

Figure 8:
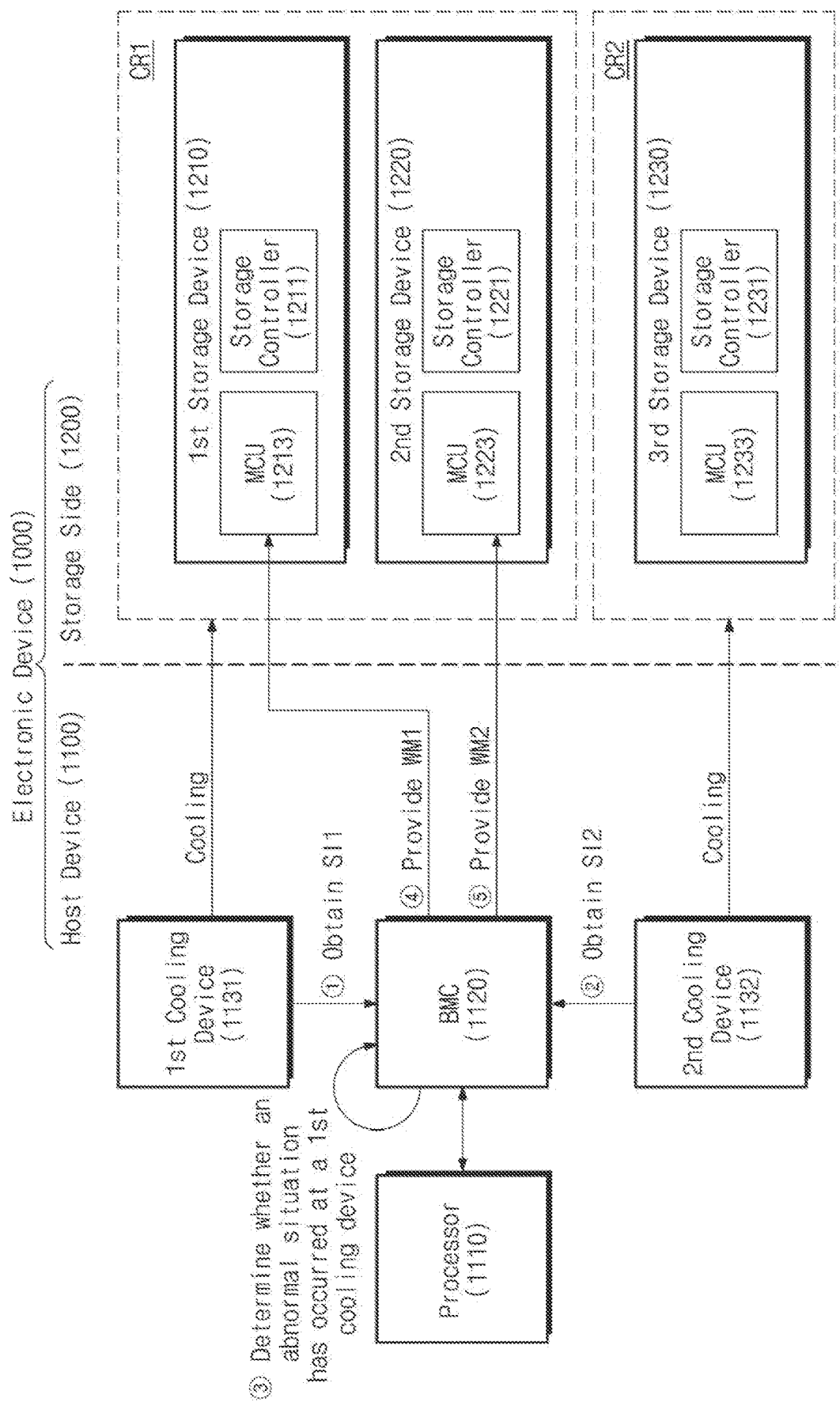
FIG. 8 is a diagram describing a method of operating an electronic device of FIG. 6, according to some example embodiments.

FIG. 8 is a diagram describing a method of operating an electronic device of FIG. 6, according to some example embodiments. Referring to FIG. 8, the electronic device 1000 may include the host device 1100 and the storage side 1200. The host device 1100 may include the processor 1110, the BMC 1120, the first cooling device 1131, and the second cooling device 1132. The storage side 1200 may include the first to third storage devices 1210 to 1230.

The first storage device 1210 may include the storage controller 1211 and the MCU 1213. The second storage device 1220 may include the storage controller 1221 and the MCU 1223. The third storage device 1230 may include the storage controller 1231 and the MCU 1233.

The processor 1110 and the storage controller 1211 may directly communicate with each other through the first communication interface. The BMC 1120 and the MCU 1213 may directly communicate with each other through the second communication interface. The processor 1110 and the storage controller 1221 may directly communicate with each other through the third communication interface. The BMC 1120 and the MCU 1223 may directly communicate with each other through the fourth communication interface. The processor 1110 and the storage controller 1231 may directly communicate with each other through the fifth communication interface. The BMC 1120 and the MCU 1233 may directly communicate with each other through the sixth communication interface.

In this case, the first to sixth communication interfaces may be implemented independently of each other. The first, third, and fifth communication interfaces may support the in-band communication. The second, fourth, and sixth communication interfaces may support the out-of-band communication.

The first cooling device 1131 may cool the first and second storage devices 1210 and 1220 disposed in the first cooling region CR1. The first storage device 1210 may be disposed to be physically adjacent to the second storage device 1220. The influence of the cooling operation of the first cooling device 1131 on the third storage device 1230 disposed in the second cooling region CR2 may be small.

The second cooling device 1132 may cool the third storage device 1230 disposed in the second cooling region CR2. The third storage device 1230 may be disposed to be physically spaced from the first storage device 1210. The influence of the cooling operation of the second cooling device 1132 on the first and second storage devices 1210 and 1220 disposed in the first cooling region CR1 may be small.

Below, a method of operating the electronic device 1000, which is based on the monitoring of the first and second cooling devices 1131 and 1132 performed by the host device 1100 in the multi-storage environment, will be described.

In a first operation ①, the BMC 1120 may obtain first status information SI1 by monitoring the first cooling device 1131. The first status information SI1 may include first operation state information of the first cooling device 1131. The first operation state information may indicate whether the failure occurs in the first cooling device 1131 or may indicate whether the first cooling device 1131 operates abnormally.

In a second operation ②, the BMC 1120 may obtain second status information SI2 by monitoring the second cooling device 1132. The second status information SI2 may include second operation state information of the second cooling device 1132. The second operation state information may indicate whether the failure occurs in the second cooling device 1132 or may indicate whether the second cooling device 1132 operates abnormally.

In a third operation ③, the BMC 1120 may determine whether the abnormal situation occurs, based on the first status information SI1 and the second status information SI2. For example, the first status information SI1 may indicate that the first cooling device 1131 fails or operates abnormally. The second status information SI2 may indicate that the second cooling device 1132 does not fail and operates normally. In this case, based on the first and second status information SI and SI2, the BMC 1120 may determine that the abnormal situation occurs in the first cooling device 1131 among the first and second cooling devices 1131 and 1132.

The correlation of the abnormal situation associated with the first cooling device 1131 with the first and second storage devices 1210 and 1220 may be high, but the correlation of the abnormal situation associated with the first cooling device 1131 with the third storage device 1230 may be low. In response to determining that the abnormal situation associated with the first cooling device 1131 occurs, the BMC 1120 may generate a first warning message WM1 to be provided to the first storage device 1210 and a second warning message WM2 to be provided to the second storage device 1220. In this case, the BMC 1120 may not generate other warning message (e.g., a third warning message) to be provided to the third storage device 1230 having the low correlation with the abnormal situation.

In a fourth operation ④, the BMC 1120 may provide the first warning message WM1 to the MCU 1213 of the first storage device 1210. In detail, in response to determining that the abnormal situation occurs in the first cooling device 1131, the BMC 1120 may provide the first warning message WM1 to the MCU 1213 through the second communication interface being a direct communication interface between the BMC 1120 and the MCU 1213. The MCU 1213 may perform the preventive action based on the first warning message WM1. For example, the preventive action of the MCU 1213 may include adjusting a driving voltage level or a driving frequency level of the first storage device 1210 or backing up user data buffered in the storage controller 1211.

In a fifth operation ⑤, the BMC 1120 may provide the second warning message WM2 to the MCU 1223 of the second storage device 1220. In detail, in response to determining that the abnormal situation occurs in the second cooling device 1132, the BMC 1120 may provide the second warning message WM2 to the MCU 1223 through the fourth communication interface being a direct communication interface between the BMC 1120 and the MCU 1223. The MCU 1223 may perform the preventive action based on the second warning message WM2. For example, the preventive action of the MCU 1223 may include adjusting a driving voltage level or a driving frequency level of the second storage device 1220 or backing up user data buffered in the storage controller 1221.

Figure 9:
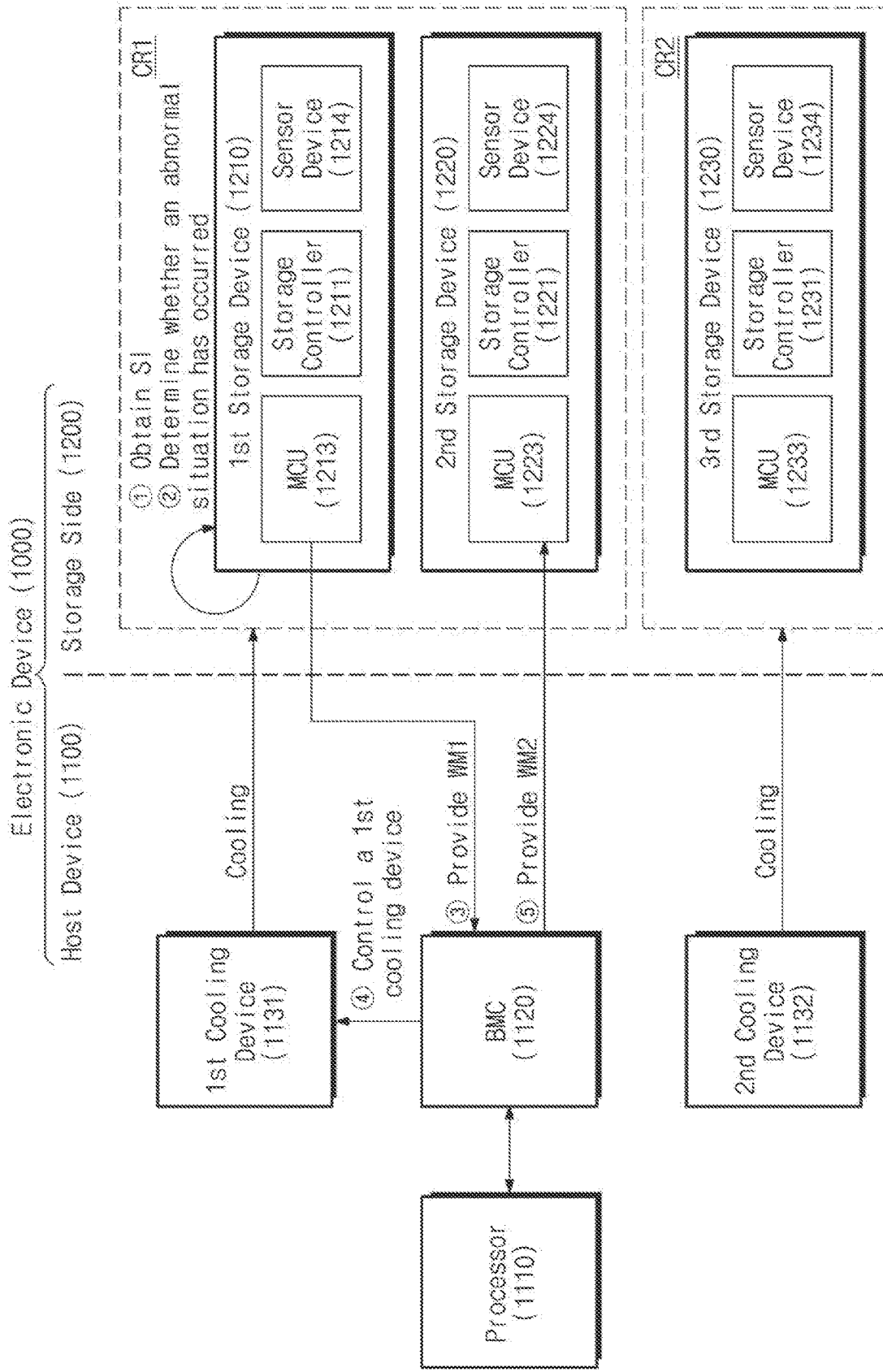
FIG. 9 is a diagram describing a method of operating an electronic device of FIG. 6, according to some example embodiments.

FIG. 9 is a diagram describing a method of operating an electronic device of FIG. 6, according to some example embodiments. Referring to FIG. 9, the electronic device 1000 may include the host device 1100 and the storage side 1200. The host device 1100 may include the processor 1110, the BMC 1120, the first cooling device 1131, and the second cooling device 1132. The storage side 1200 may include the first to third storage devices 1210 to 1230.

The processor 1110, the BMC 1120, the first cooling device 1131, the second cooling device 1132, the first storage device 1210, the second storage device 1220, and the third storage device 1230 are similar to the processor 1110, the BMC 1120, the first cooling device 1131, the second cooling device 1132, the first storage device 1210, the second storage device 1220, and the third storage device 1230 of FIG. 8, and thus, additional description will be omitted to avoid redundancy.

The first storage device 1210 may include the storage controller 1211, the MCU 1213, and a sensor device 1214. The sensor device 1214 may sense characteristics of an internal physical environment (e.g., a temperature or a voltage) of the first storage device 1210.

The second storage device 1220 may include the storage controller 1221, the MCU 1223, and a sensor device 1224. The sensor device 1224 may sense characteristics of an internal physical environment of the second storage device 1220.

The third storage device 1230 may include the storage controller 1231, the MCU 1233, and a sensor device 1234. The sensor device 1234 may sense characteristics of an internal physical environment of the third storage device 1230.

Below, a method of operating the electronic device 1000, which is based on the monitoring of the sensor device 1214 by the storage side 1200 in the multi-storage environment, will be described.

In a first operation ①, the MCU 1213 of the first storage device 1210 may obtain the status information SI by the monitoring operation of the sensor device 1214. The status information SI may include a sensed temperature value indicating a temperature sensed by the sensor device 1214.

In a second operation ②, the MCU 1213 may determine whether the abnormal situation occurs in the first storage device 1210, based on the status information SI. For example, the status information SI may include the sensed temperature value. The MCU 1213 may compare the sensed temperature value and the threshold temperature value, and when the sensed temperature value is greater than the threshold temperature value, the MCU 1213 may generate the first warning message WM1. The first warning message WM1 may indicate that the abnormal situation occurs in the first storage device 1210.

In a third operation ③, the MCU 1213 may provide the first warning message WM1 to the BMC 1120. In detail, in response to determining that the abnormal situation occurs in the first storage device 1210, the MCU 1213 may provide the first warning message WM1 to the BMC 1120 through the direct communication interface between the BMC 1120 and the MCU 1213. The direct communication interface between the BMC 1120 and the MCU 1213 may support the out-of-band communication.

As an example, the description will be given as the first storage device 1210 performs the monitoring of the sensor device 1214, but example embodiments are not limited thereto. As in the above description, the second storage device 1220 may determine whether the abnormal situation occurs, based on the monitoring of the sensor device 1224, and when it is determined that the abnormal situation occurs, the second storage device 1220 may provide a relevant warning message to the BMC 1120 by using the out-of-band communication. The third storage device 1230 may determine whether the abnormal situation occurs, based on the monitoring of the sensor device 1234, and when it is determined that the abnormal situation occurs, the third storage device 1230 may provide a relevant warning message to the BMC 1120 by using the out-of-band communication.

The BMC 1120 may perform the preventive action based on the first warning message WM1. The preventive action of the BMC 1120 may include a fourth operation ④ and a fifth operation ⑤.

In a fourth operation ④, the BMC 1120 may control the first cooling device 1131 based on the first warning message WM1. For example, the first warning message WM1 may indicate the abnormal situation associated with the temperature of the first storage device 1210. The first cooling device 1131 may cool the first storage device 1210. The BMC 1120 may increase the driving level of the first cooling device 1131 based on the first warning message WM1 and thus may contribute to heat management of the first storage device 1210 by increasing the airflow to the first cooling region CR1.

In a fifth operation ⑤, the BMC 1120 may generate the second warning message WM2 based on the first warning message WM1 and may provide the second warning message WM2 to the MCU 1223 of the second storage device 1220. For example, the second storage device 1220 may be disposed to be physically adjacent to the first storage device 1210. When the temperature of the first storage device 1210 is high, there may be the probability that the temperature of the second storage device 1220 is high. The BMC 1120 may provide the second warning message WM2 to the second storage device 1220, preemptively, based on the first warning message WM1.

In detail, in response to receiving the first warning message WM1, the BMC 1120 may provide the second warning message WM2 to the MCU 1223 through the direct communication interface between the BMC 1120 and the MCU 1223. The direct communication interface between the BMC 1120 and the MCU 1223 may support the out-of-band communication.

The MCU 1223 of the second storage device 1220 may perform the preventive action based on the second warning message WM2. The preventive action of the MCU 1223 may include adjusting a driving voltage level or a driving frequency level of the second storage device 1220 or backing up user data buffered in the storage controller 1221.

Figure 10:
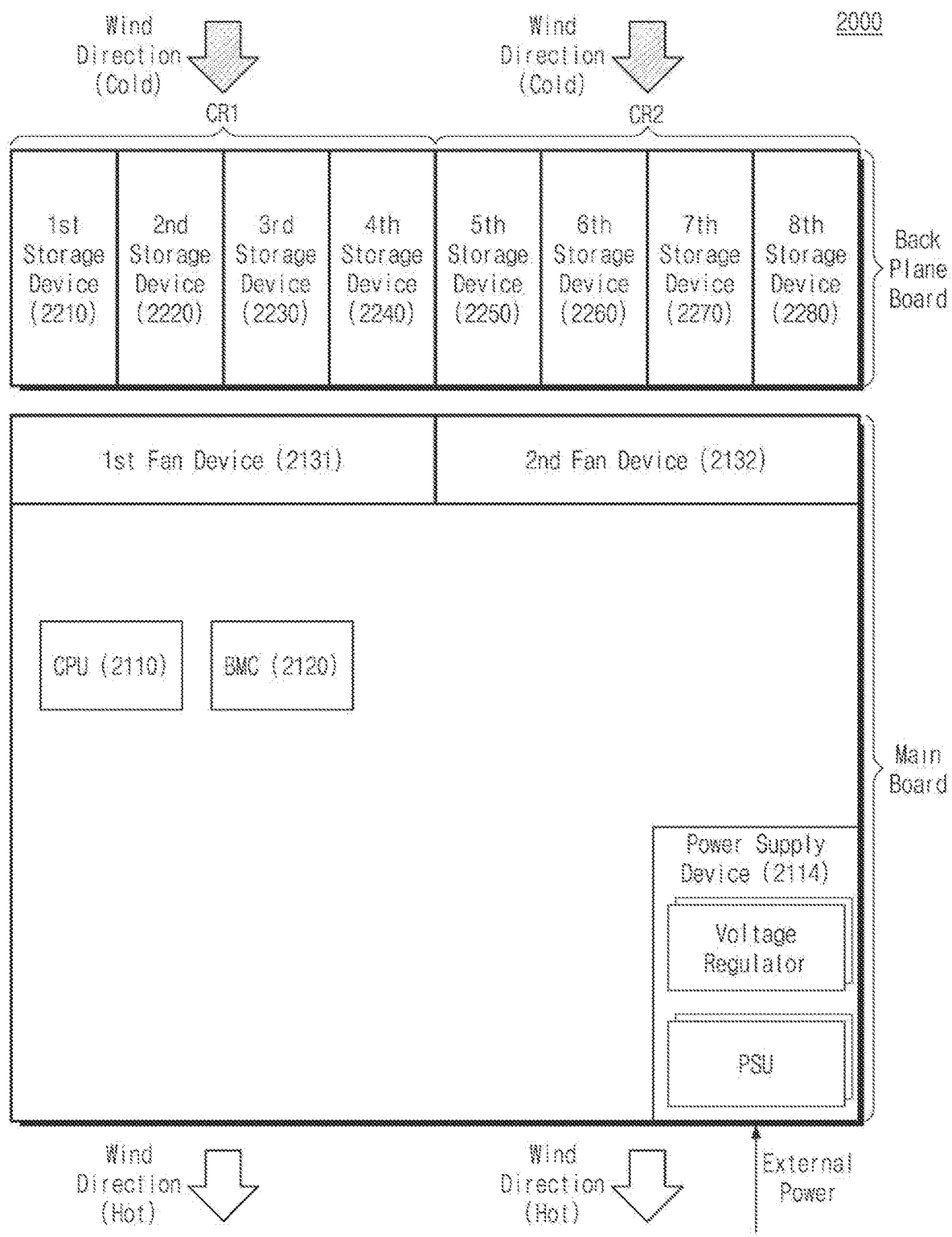
FIG. 10 is a diagram describing a layout of an electronic device according to some example embodiments.

FIG. 10 is a diagram describing a layout of an electronic device according to some example embodiments. An example of a layout of an electronic device 2000 will be described with reference to FIG. 10. The electronic device 2000 may include a main board and a back-plane board. The main board and the back-plane board may be electrically connected to each other.

The back-plane board of the electronic device 2000 may include first to eighth storage devices 2210 to 2280. Each of the first to eighth storage devices 2210 to 2280 may correspond to the storage device 120 of FIG. 2.

The first to eighth storage devices 2210 to 2280 may be connected into PCIe sockets on the back-plane board. The PCIe sockets on the back-plane board may be electrically connected to the main board through a PCIe interface. Also, each of the first to eighth storage devices 2210 to 2280 may include a corresponding storage controller supporting the in-band communication with a CPU 2110 and a corresponding MCU supporting the out-of-band communication with a BMC 2120.

The main board of the electronic device 2000 may include first and second fan devices 2131 and 2132, the CPU 2110, the BMC 2120, and a power supply device 2114. The first and second fan devices 2131 and 2132 may correspond to the cooling device 113 of FIG. 2. The CPU 2110 may correspond to the processor 111 of FIG. 2. The BMC 2120 may correspond to the BMC 112 of FIG. 2. The power supply device 2114 may correspond to the power supply device 114 of FIG. 2.

The first fan device 2131 may cool the first to fourth storage devices 2210 to 2240 disposed in the first cooling region CR1. For example, a direction in which the cold air flows may face the first fan device 2131 from the first to fourth storage devices 2210 to 2240. In this regard, the air may flow from the first to fourth storage devices 2210 to 2240 to the first fan device 2131. However, example embodiments are not limited thereto. For example, the first fan device 2131 may cause the air to flow from the first fan device 2131 to the first to fourth storage devices 2210 to 2240 such that the first to fourth storage devices 2210 to 2240 are cooled.

The second fan device 2132 may cool the fifth to eighth storage devices 2250 to 2280 disposed in the second cooling region CR2. For example, a direction in which the cold air flows may face the second fan device 2132 from the fifth to eighth storage devices 2250 to 2280. In this regard, the air may flow from the fifth to eighth storage devices 2250 to 2280 to the second fan device 2132. However, example embodiments are not limited thereto. For example, the second fan device 2132 may cause the air to flow from the second fan device 2132 to the fifth to eighth storage devices 2250 to 2280 such that the fifth to eighth storage devices 2250 to 2280 are cooled.

The cold air introduced by the first and second fan devices 2131 and 2132 may become hot while passing through the storage devices 2210 to 2280, and the hot air may be discharged to the outside through the main board side of the electronic device 2000.

The power supply device 2114 may receive an external power (e.g., an AC power) from the outside of the electronic device 2000. The power supply device 2114 may include a plurality of power supply circuits (PSU). The plurality of power supply circuits (PSU) may generate a power supply voltage based on the external power and may provide the power supply voltage to the first to eighth storage devices 2210 to 2280.

Figure 11:
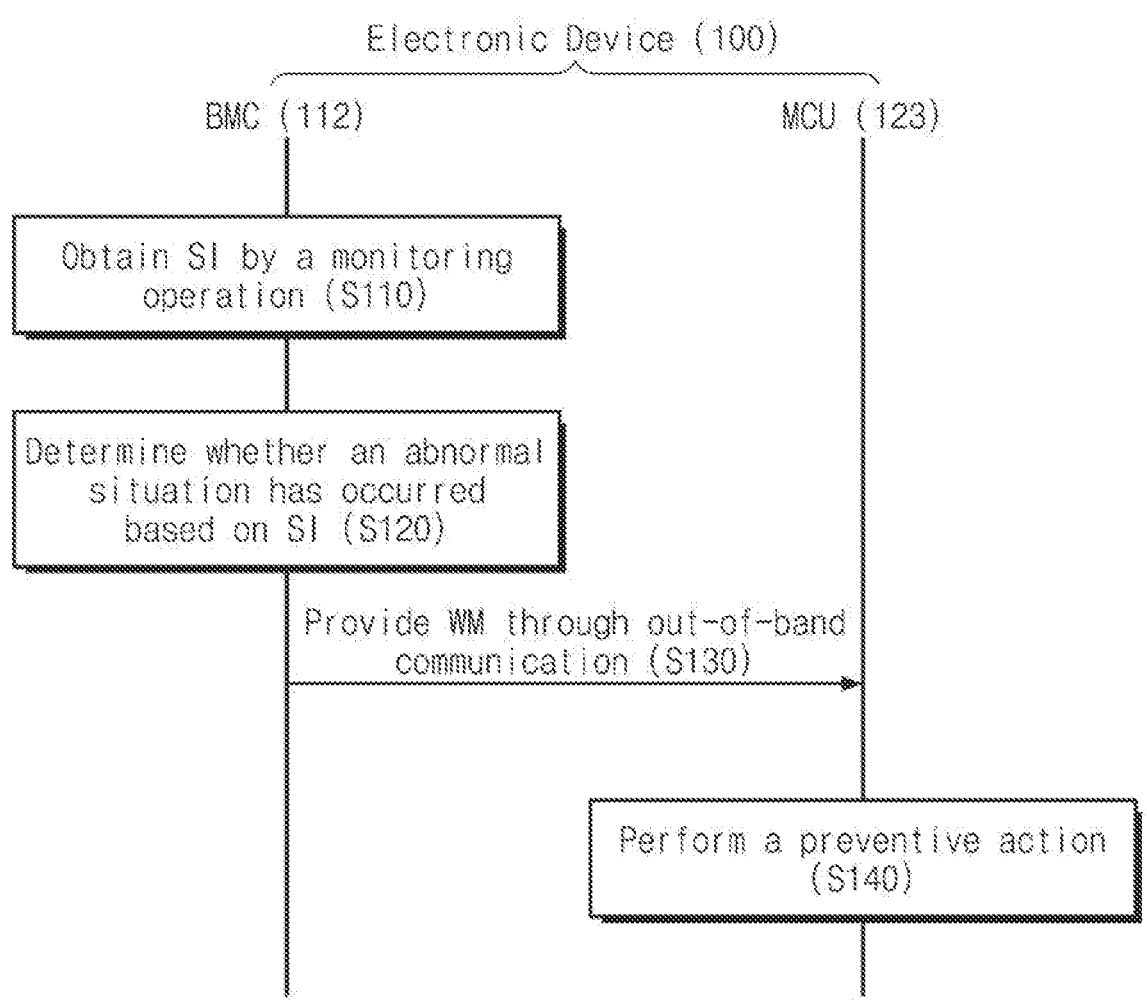
FIG. 11 is a flowchart describing a method of operating an electronic device according to some example embodiments.

FIG. 11 is a flowchart describing a method of operating an electronic device according to some example embodiments. A method of operating the electronic device 100 according to some example embodiments will be described with reference to FIG. 11. The electronic device 100 may include the BMC 112 and the MCU 123. The BMC 112 may correspond to the BMC 112 of FIGS. 1 to 5. The MCU 123 may correspond to the MCU 123 of FIGS. 1 to 5.

In operation S110, the BMC 112 may obtain the status information SI by the monitoring operation. For example, the BMC 112 may obtain the status information SI by monitoring a cooling device or a power supply device in a host device of the electronic device 100. The status information SI may indicate whether the cooling device or the power supply device fails or operates abnormally.

In operation S120, the BMC 112 may determine whether the abnormal situation occurs, based on the status information SI. The abnormal situation may indicate the failure or abnormal operation of the cooling device or the power supply device of the electronic device 100. When it is determined that the abnormal situation does not occur, the BMC 112 may again perform operation S110. When it is determined that the abnormal situation occurs, the BMC 112 may perform operation S130.

In operation S130, the BMC 112 may provide the warning message WM to the MCU 123 through the direct communication interface between the BMC 112 and the MCU 123. The direct communication interface between the BMC 112 and the MCU 123 may support the out-of-band communication.

In operation S140, the MCU 123 may perform the preventive action based on the warning message WM. The preventive action of the MCU 123 may include adjusting a driving voltage level or a driving frequency level of a storage device of the electronic device 100 or backing up user data buffered in a buffer memory of a storage controller that the storage device of the electronic device 100 includes.

Figure 12:
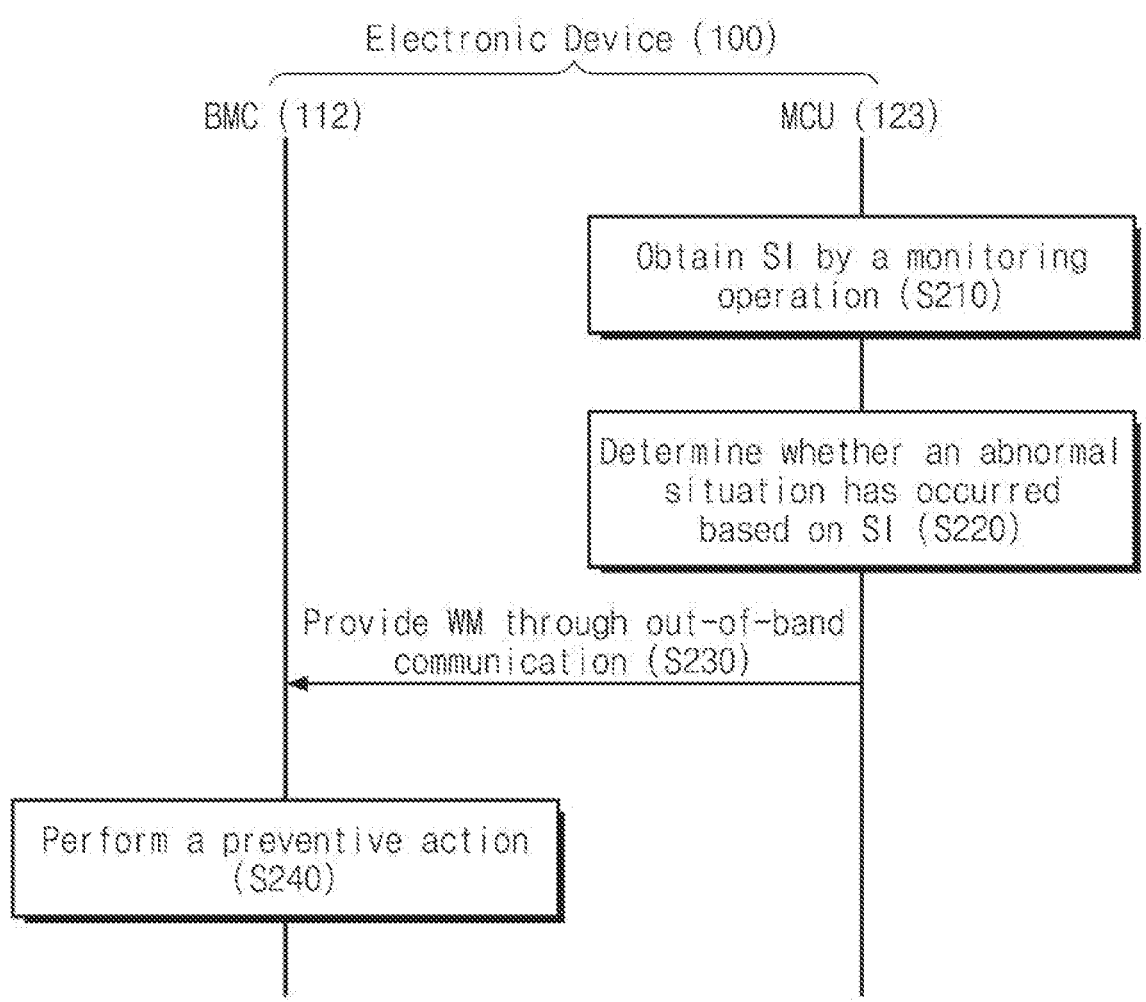
FIG. 12 is a flowchart describing a method of operating an electronic device according to some example embodiments.

FIG. 12 is a flowchart describing a method of operating an electronic device according to some example embodiments. A method of operating the electronic device 100 according to some example embodiments will be described with reference to FIG. 12. The electronic device 100 may include the BMC 112 and the MCU 123. The BMC 112 may correspond to the BMC 112 of FIGS. 1 to 5. The MCU 123 may correspond to the MCU 123 of FIGS. 1 to 5.

In operation S210, the MCU 123 may obtain the status information SI by the monitoring operation. For example, the MCU 123 may obtain the status information SI by monitoring a sensor device in a storage device of the electronic device 100. The status information SI may include a sensed temperature value indicating a temperature sensed by the sensor device or a sensed voltage level indicating a voltage level sensed by the sensor device.

In operation S220, the MCU 123 may determine whether the abnormal situation occurs, based on the status information SI. The abnormal situation may indicate that the sensed temperature value of the storage device of the electronic device 100 is higher than the threshold temperature value or that the sensed voltage level of the power supply voltage of the storage device of the electronic device 100 is lower than the threshold voltage level. When it is determined that the abnormal situation does not occur, the MCU 123 may again perform operation S210. When it is determined that the abnormal situation occurs, the MCU 123 may perform operation S230.

In operation S230, the MCU 123 may provide the warning message WM to the BMC 112 through the direct communication interface between the BMC 112 and the MCU 123. The direct communication interface between the BMC 112 and the MCU 123 may support the out-of-band communication.

In operation S240, the BMC 112 may perform the preventive action based on the warning message WM. The preventive action of the BMC 112 may include increasing a driving level of a cooling device included in a host device of the electronic device 100. Alternatively, the preventive action of the BMC 112 may include transmitting a first warning message to a processor based on the warning message WM of the electronic device 100 and transmitting second warning messages to the remaining components in the host device by the processor.

According to an example embodiment, an electronic device providing a warning message through a communication interface and a method of operating the same are provided.

Also, an electronic device that quickly senses hardware failure, performs a preventive action in real time, and suppresses consumption of a bandwidth of the in-band communication and a decrease in a data transfer rate in the in-band communication by transmitting a warning message through a direct communication interface between a BMC and an MCU and a method of operating the same are provided.

While aspects of example embodiments have been described, it will be apparent to those of ordinary skill in the art that various changes and modifications may be made thereto without departing from the spirit and scope of the present disclosure as set forth in the following claims.

What is claimed is:

1. A method of operating an electronic device which includes a host device and a first storage device, wherein the host device includes a processor and a baseboard management controller and the first storage device includes a first storage controller and a first micro controller, the method comprising:
    performing a first monitoring operation to obtain first status information, by the baseboard management controller;
    determining whether a first abnormal situation occurs, based on the first status information, by the baseboard management controller;
    providing a first warning message to the first micro controller through a first communication interface based on determining that the first abnormal situation occurs, by the baseboard management controller, wherein the first communication interface is a direct communication interface between the baseboard management controller and the first micro controller; and
    performing a first preventive action based on the first warning message, by the first micro controller, wherein the first preventive action comprises any one or any combination of adjusting a driving voltage level of the first storage device, adjusting a driving frequency level of the first storage device, or providing a backup request to the first storage controller to control the first storage controller to back up buffered user data.

2. The method of claim 1, further comprising controlling the processor and the first storage controller to communicate with each other through a second communication interface, and
    wherein the second communication interface is a direct communication interface between the processor and the first storage controller, and is different from the first communication interface.

3. The method of claim 2, wherein the first communication interface supports out-of-band communication, and
    wherein the second communication interface supports in-band communication.

4. The method of claim 1, wherein the host device further includes a cooling device configured to cool the first storage device,
    wherein the first status information includes first operation state information corresponding to the cooling device, and
    wherein the first abnormal situation indicates failure or an abnormal operation of the cooling device.

5. The method of claim 4, wherein the performing the first preventive action based on the first warning message by the first micro controller comprises:
    adjusting the driving voltage level of the first storage device based on the first warning message, by the first micro controller.

6. The method of claim 1, wherein the adjusting the driving voltage level or the driving frequency level of the first storage device based on the first warning message by the first micro controller comprises initiating a dynamic thermal throttling operation based on the first warning message, by the first micro controller.

7. The method of claim 1, wherein the performing the first preventive action based on the first warning message by the first micro controller comprises:
    storing the buffered user data in a non-volatile memory device of the first storage device based on the backup request, by the first storage controller; or
    providing the buffered user data to a persistent memory of the first micro controller based on the backup request, by the first storage controller.

8. The method of claim 4, wherein the electronic device further includes a second storage device adjacent to the first storage device,
- wherein the second storage device includes a second storage controller and a second micro controller,
- wherein the cooling device is further configured to cool the second storage device, and
- wherein the method further comprises:
  - providing a second warning message to the second micro controller through a third communication interface, based on determining that the first abnormal situation occurs, by the baseboard management controller, wherein the third communication interface is a direction communication interface between the baseboard management controller and the second micro controller; and
  - performing a second preventive action based on the second warning message, by the second micro controller.

9. The method of claim 1, wherein the host device further includes a power supply device configured to provide a power supply voltage to the first storage device,
- wherein the first status information includes second operation state information corresponding to the power supply device, and
- wherein the first abnormal situation indicates failure or an abnormal operation of the power supply device.

10. The method of claim 9, wherein the performing the first preventive action based on the first warning message comprises providing the backup request to the first storage controller to control the first storage controller to back up the buffered user data based on the first warning message, by the first micro controller.

11. The method of claim 10, wherein the performing the first preventive action based on the first warning message comprises:
- storing the buffered user data in a non-volatile memory device of the first storage device based on the backup request, by the first storage controller; or
- providing the buffered user data to a persistent memory of the first storage controller based on the backup request, by the first storage controller.

12. The method of claim 1, further comprising:
- performing a second monitoring operation to obtain second status information, by the first micro controller;
- determining whether a second abnormal situation occurs, based on the second status information, by the first micro controller;
- providing a third warning message to the baseboard management controller through the first communication interface, based on determining that the second abnormal situation occurs, by the first micro controller; and
- performing a third preventive action based on the third warning message, by the baseboard management controller.

13. The method of claim 12, wherein the host device further includes a cooling device configured to cool the first storage device,
- wherein the first storage device further includes a temperature sensor configured to sense a temperature of the first storage device,
- wherein the second status information indicates a sensed temperature value indicating the temperature,
- wherein the second abnormal situation indicates that the sensed temperature value is greater than a threshold temperature value, and
- wherein the performing the third preventive action comprises increasing a driving level of the cooling device.

14. The method of claim 13, wherein the electronic device further includes a second storage device adjacent to the first storage device,
- wherein the second storage device includes a second storage controller and a second micro controller, and
- wherein the method further comprises:
  - providing a fourth warning message to the second micro controller through a third communication interface, based on the third warning message, by the baseboard management controller, wherein the third communication interface is a direct communication interface between the baseboard management controller and the second micro controller; and
  - performing a fourth preventive action based on the fourth warning message, by the second micro controller.

15. The method of claim 12, wherein the host device further includes a power supply device configured to provide a power supply voltage to the first storage device,
- wherein the first storage device further includes a voltage sensor configured to sense a voltage level of the power supply voltage received from the power supply device,
- wherein the second status information indicates the voltage level sensed by the voltage sensor,
- wherein the second abnormal situation indicates that the voltage level is lower than a threshold voltage level, and
- wherein the performing the third preventive action comprises transmitting a fourth warning message to the processor based on the third warning message.

16. A method of operating an electronic device which includes a host device and a storage device, wherein the host device includes a processor and a baseboard management controller and the storage device includes a storage controller and a micro controller, the method comprising:
- performing a first monitoring operation to obtain first status information, by the micro controller;
- determining whether a first abnormal situation occurs, based on the first status information, by the micro controller;
- providing a first warning message to the baseboard management controller through a direct communication interface between the baseboard management controller and the micro controller, based on determining that the first abnormal situation occurs, by the baseboard management controller; and
- performing a first preventive action based on the first warning message, by the baseboard management controller, wherein the first preventive action comprises any one or any combination of adjusting a driving voltage level of the storage device, adjusting a driving frequency level of the storage device, or providing a backup request to the storage controller to control the storage controller to back up buffered user data.

17. The method of claim 16, further comprising:
- performing a second monitoring operation to obtain second status information, by the baseboard management controller;
- determining whether a second abnormal situation occurs, based on the second status information, by the baseboard management controller;
- providing a second warning message to the micro controller through the direct communication interface, in response to determining that the second abnormal situation occurs, by the baseboard management controller; and performing a second preventive action based on the second warning message, by the micro controller.

18. An electronic device comprising:

a host device comprising a processor, a baseboard management controller, a cooling device, and a power supply device; and a storage device comprising a storage controller configured to directly communicate with the processor through a first communication interface, a micro controller configured to directly communicate with the baseboard management controller through a second communication interface different from the first communication interface, and a sensor device, wherein the baseboard management controller is configured to:

obtain first status information corresponding to a first monitoring operation for the cooling device or the power supply device;

determine whether a first abnormal situation occurs, based on the first status information; and provide a first warning message to the micro controller through the second communication interface, based on determining that the first abnormal situation occurs, and wherein the micro controller is configured to:

based on the first warning message, control a preventative action comprising any one or any combination of adjusting a driving voltage level of the storage device, adjusting a driving frequency level of the storage device, or providing a backup request to the storage controller to control buffered user data to be backed up;

obtain second status information corresponding to a second monitoring operation for the sensor device;

determine whether a second abnormal situation occurs, based on the second status information; and provide a second warning message to the baseboard management controller through the second communication interface, based on determining that the second abnormal situation occurs.

19. The electronic device of claim 18, wherein the first status information comprises first operation state information corresponding to the cooling device or second operation state information corresponding to the power supply device, wherein the first abnormal situation indicates failure or an abnormal operation of the cooling device or the power supply device, and wherein the micro controller is further configured to:

adjust the driving voltage level of the storage device based on the first warning message.

20. The electronic device of claim 18, wherein the sensor device comprises a temperature sensor and a voltage sensor, wherein the second status information indicates a sensed temperature value indicating a temperature sensed by the temperature sensor or a voltage level sensed by the voltage sensor, wherein the second abnormal situation indicates that the sensed temperature value is greater than a threshold temperature value or that the voltage level is lower than a threshold voltage level, and wherein the baseboard management controller is further configured to:

increase a driving level of the cooling device based on the second warning message; or transmit a third warning message to the processor based on the second warning message.

* * * * *